United States Patent
Harte et al.

(10) Patent No.: US 12,354,468 B2
(45) Date of Patent: Jul. 8, 2025

(54) BATTERY-POWERED CONTROL DEVICE CONFIGURED TO DETECT PERSISTENT ACTUATION

(71) Applicant: Lutron Technology Company LLC, Coopersburg, PA (US)

(72) Inventors: Matthew V. Harte, Stewartsville, NJ (US); Jeffrey S. Hayes, Allentown, PA (US); Stephen M. Ludwig, Jr., Coopersburg, PA (US); Robert C. Newman, Jr., Emmaus, PA (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/377,010

(22) Filed: Oct. 5, 2023

(65) Prior Publication Data

US 2024/0029551 A1     Jan. 25, 2024

Related U.S. Application Data

(63) Continuation of application No. 17/715,250, filed on Apr. 7, 2022, now Pat. No. 11,816,979, which is a
(Continued)

(51) Int. Cl.
*G08C 17/02* (2006.01)
*G06F 1/3234* (2019.01)
(Continued)

(52) U.S. Cl.
CPC .......... *G08C 17/02* (2013.01); *G06F 1/3246* (2013.01); *G06F 1/325* (2013.01); *H01H 3/02* (2013.01);
(Continued)

(58) Field of Classification Search
CPC ....... G08C 17/02; G06F 1/3246; G06F 1/325; H01H 3/02; H01H 2300/03; H05B 47/19
See application file for complete search history.

(56) References Cited

U.S. PATENT DOCUMENTS 5,264,761 A    11/1993   Johnson et al.
5,905,442 A    5/1999   Mosebrook et al.
(Continued)

FOREIGN PATENT DOCUMENTS

CN          2596671 Y     12/2003
CN     101347050 A     1/2009
(Continued)

*Primary Examiner* — Hongmin Fan
(74) *Attorney, Agent, or Firm* — Flaster Greenberg P.C

(57) ABSTRACT

Provided herein are examples of a remote control device that provides a retrofit solution for an existing switched control system. The remote control device may comprise a control circuit, a rotatable portion, a magnetic ring coupled to the rotatable portion, and first and second Hall-effect sensor circuits configured to generate respective first and second sensor control signals in response to magnetic fields generated by the magnetic elements. The control circuit may operate in a normal mode when the rotatable portion is being rotated, and in a reduced-power mode when the rotatable portion is not being rotated. The control circuit may disable the second Hall-effect sensor circuit in the reduced-power mode. The control circuit may detect movement of the rotatable portion in response to the first sensor control signal in the reduced-power mode and enable the second Hall-effect sensor circuit in response to detecting movement of the rotatable portion.

20 Claims, 14 Drawing Sheets

Related U.S. Application Data continuation of application No. 17/035,897, filed on Sep. 29, 2020, now Pat. No. 11,335,185, which is a continuation of application No. 16/245,027, filed on Jan. 10, 2019, now Pat. No. 10,856,396, which is a continuation of application No. 15/789,666, filed on Oct. 20, 2017, now Pat. No. 10,219,359.

(60) Provisional application No. 62/485,612, filed on Apr. 14, 2017, provisional application No. 62/411,359, filed on Oct. 21, 2016.

(51) Int. Cl.
    *G06F 1/3246*     (2019.01)
    *H01H 3/02*     (2006.01)
    *H05B 47/115*     (2020.01)
    *H05B 47/19*     (2020.01)

(52) U.S. Cl.
    CPC ........... *H05B 47/115* (2020.01); *H05B 47/19* (2020.01); *H01H 2300/03* (2013.01)

(56) References Cited

U.S. PATENT DOCUMENTS

| | | |
|---|---|---|
| 7,573,208 B2 | 8/2009 | Newman et al. |
| 7,834,856 B2 | 11/2010 | Grinshpoon et al. |
| 7,940,167 B2 | 5/2011 | Steiner et al. |
| 8,009,042 B2 | 8/2011 | Steiner et al. |
| 8,072,379 B2 | 12/2011 | Gopinath |
| 8,167,457 B1 | 5/2012 | Forster et al. |
| 8,199,010 B2 | 6/2012 | Sloan et al. |
| 8,228,184 B2 | 7/2012 | Blakeley et al. |
| 8,330,638 B2 | 12/2012 | Altonen et al. |
| 8,410,706 B2 | 4/2013 | Steiner et al. |
| 8,451,116 B2 | 5/2013 | Steiner et al. |
| 8,729,890 B2 | 5/2014 | Donovan et al. |
| 8,786,196 B2 | 7/2014 | Biery et al. |
| 8,892,913 B2 | 11/2014 | Newman et al. |
| 8,950,461 B2 | 2/2015 | Adams et al. |
| 9,208,965 B2 | 12/2015 | Busby et al. |
| D761,277 S | 7/2016 | Harvell |
| 9,418,802 B2 | 8/2016 | Romano et al. |
| 9,520,247 B1 | 12/2016 | Finnegan et al. |
| 9,583,288 B2 | 2/2017 | Jones et al. |
| 9,746,138 B1 | 8/2017 | Thomas et al. |
| 9,799,469 B2 | 10/2017 | Bailey et al. |
| 9,904,380 B2 | 2/2018 | Park et al. |
| 9,959,997 B2 | 5/2018 | Bailey et al. |
| 2003/0019733 A1 | 1/2003 | Sato |
| 2003/0230982 A1 | 12/2003 | Pagano et al. |
| 2007/0090934 A1 | 4/2007 | Knittl |
| 2007/0103820 A1 | 5/2007 | Kobayashi et al. |
| 2008/0079705 A1* | 4/2008 | Yang .................... G09G 3/3413 345/207 |
| 2008/0111491 A1 | 5/2008 | Spira et al. |
| 2008/0315798 A1 | 12/2008 | Diederiks et al. |
| 2009/0206983 A1 | 8/2009 | Knode et al. |
| 2009/0256483 A1 | 10/2009 | Gehman et al. |
| 2010/0084996 A1 | 4/2010 | Van De Sluis et al. |
| 2010/0127626 A1 | 5/2010 | Altonen et al. |
| 2010/0244706 A1 | 9/2010 | Steiner et al. |
| 2010/0244709 A1 | 9/2010 | Steiner et al. |
| 2011/0074552 A1 | 3/2011 | Norair et al. |
| 2011/0212665 A1 | 9/2011 | Van |
| 2011/0298597 A1 | 12/2011 | Kaihori et al. |
| 2012/0262155 A1 | 10/2012 | Donovan et al. |
| 2012/0281606 A1 | 11/2012 | Cooney et al. |
| 2012/0292174 A1 | 11/2012 | Mah et al. |
| 2013/0099011 A1 | 4/2013 | Matsuoka et al. |
| 2013/0099124 A1 | 4/2013 | Filson et al. |
| 2013/0222122 A1 | 8/2013 | Killo et al. |
| 2013/0338839 A1 | 12/2013 | Rogers et al. |
| 2014/0117859 A1 | 5/2014 | Swatsky et al. |
| 2014/0117871 A1 | 5/2014 | Swatsky et al. |
| 2014/0145646 A1 | 5/2014 | Zhang et al. |
| 2014/0152186 A1 | 6/2014 | Zhang |
| 2014/0266669 A1 | 9/2014 | Fadell et al. |
| 2014/0268628 A1 | 9/2014 | Mann et al. |
| 2015/0035437 A1* | 2/2015 | Panopoulos ............ B60L 53/12 315/291 |
| 2015/0077021 A1 | 3/2015 | McCarthy et al. |
| 2015/0294816 A1 | 10/2015 | Evers et al. |
| 2015/0371534 A1 | 12/2015 | Dimberg et al. |
| 2016/0007431 A1 | 1/2016 | Bosua et al. |
| 2016/0073479 A1 | 3/2016 | Erchak et al. |
| 2016/0252980 A1 | 9/2016 | Park et al. |
| 2016/0353559 A1 | 12/2016 | Mann et al. |
| 2017/0105176 A1 | 4/2017 | Finnegan et al. |
| 2017/0226799 A1 | 8/2017 | Hebeisen et al. |
| 2017/0254522 A1* | 9/2017 | Liang ................. F21V 23/0435 |
| 2018/0005742 A1 | 1/2018 | Newman et al. |
| 2018/0190451 A1* | 7/2018 | Scruggs ................ H01H 23/04 |

FOREIGN PATENT DOCUMENTS

| | | | |
|---|---|---|---|
| CN | 101999083 A | 3/2011 | |
| CN | 102293060 A | 12/2011 | |
| CN | 102483348 A | 5/2012 | |
| CN | 102725779 A | 10/2012 | |
| CN | 203491998 U | 3/2014 | |
| CN | 105554409 B * | 5/2016 | ............ H04N 23/74 |
| CN | 103869928 B | 6/2018 | |
| EP | 2159775 A1 | 3/2010 | |
| WO | WO 9848395 A1 * | 4/1998 | ............ G08G 1/097 |
| WO | 2010131155 A1 | 11/2010 | |
| WO | 2011042190 A1 | 4/2011 | |
| WO | 2014066269 A1 | 5/2014 | |

\* cited by examiner

BATTERY-POWERED CONTROL DEVICE CONFIGURED TO DETECT PERSISTENT ACTUATION

CROSS-REFERENCE TO RELATED APPLICATIONS

This application is a continuation of U.S. patent application Ser. No. 17/715,250, filed Apr. 7, 2022, which is a continuation of U.S. patent application Ser. No. 17/035,897, filed Sep. 29, 2020, which is a continuation of Ser. No. 16/245,027, filed Jan. 10, 2019, which is now U.S. Pat. No. 10,856,396, issued on Dec. 1, 2020, which is a continuation of U.S. patent application Ser. No. 15/789,666, filed on Oct. 20, 2017, which is now U.S. Pat. No. 10,219,359, issued on Feb. 26, 2019, which claims the benefit of Provisional U.S. Patent Application No. 62/485,612, filed Apr. 14, 2017, and Provisional U.S. Patent Application No. 62/411,359, filed Oct. 21, 2016, the disclosures of which are incorporated herein by reference in their entireties.

BACKGROUND

Battery-powered remote controls are used throughout the home and office to control one or more remote loads, such as lighting loads, motorized window treatments, small electronic devices, and the like. The battery-powered remote control may be handheld or mounted to a wall or tabletop stand. The battery-powered remote control may perform multiple tasks that drain the battery of the device, such as wirelessly communicate data to the load for controlling the load, store settings/conditions of the load, provide feedback (e.g., visual and/or auditory) to a user regarding the state of the load, etc. As these battery-powered remote controls provide additional features and functionality, the battery life becomes a limiting factor. Moreover, many battery-powered remote controls continue to shrink in size, which limits the size of the battery and in turn, the overall battery life of the control. Accordingly, the reduction in size and increased functionality places additional strain on the battery life of these battery-powered remote controls.

SUMMARY

Provided herein are examples of techniques and features that may be implemented in a remote control device. Some examples of these remote control devices provide a retrofit solution for an existing switched control system, although the concepts described herein may be applicable to remote control devices that are not used as part of a retrofit solution for an existing switched control system. Implementation of the remote control device may enable energy savings and/or advanced control features. For example, remote control devices that provide a retrofit solution for an existing switched control system may enable energy savings and/or advanced control features without requiring any electrical re-wiring and/or without requiring the replacement of any existing mechanical switches. The remote control device may be configured to associate with, and control, a load control device of a load control system, without requiring access to the electrical wiring of the load control system. An electrical load may be electrically connected to the load control device such that the remote control device may control an amount of power delivered to the electrical load via the load control device.

As described herein, a control device may include a sensing circuit, a processing circuit (e.g., a central processing unit (CPU)), and a wake-up logic circuit. The sensing circuit may be configured to generate a sensing signal, which for example, may be changing or in a steady state condition. The processing circuit may be configured to enter a sleep state when the sensing signal is in a steady state condition, for example, when the rotatable portion is not being rotated. The wake-up logic circuit configured to generate and pulse-width modulate (PWM) an enable control signal when the processing circuit is in the sleep state to periodically enable and disable the sensing circuit. The wake-up logic circuit may also be configured to receive the sensing signal from the sensing circuit, determine that a magnitude of the sensing signal has changed, and, upon determining that the magnitude of the sensing signal has changed, generate a wake-up signal for causing the processing circuit to change from the sleep state to an active state.

The control device may comprise a rotatable portion, a one or more magnetic elements (e.g., a magnetic ring) coupled to the rotatable portion, and one or more sensing circuits (e.g., a first and second Hall-effect sensor circuits) that are configured to generate respective first and second sensor control signals in response to magnetic fields generated by the magnetic elements. The control device may also comprise a control circuit configured to determine an angular speed and/or an angular direction of the rotatable portion in response to the first and second sensor control signals generated by the first and second Hall-effect sensor circuits, respectively. The control device may operate in a normal mode when the rotatable portion is being rotated, and in a reduced-power mode when the rotatable portion is not being rotated. The control circuit may be configured to disable the second Hall-effect sensor circuit when the control device is operating in the reduced-power mode. The control circuit may detect movement of the rotatable portion in response to the first sensor control signal in the reduced-power mode and enable the second Hall-effect sensor circuit in response to detecting movement of the rotatable portion. The control circuit may determine the angular speed and/or the angular direction of the rotatable portion in response to the first and second sensor control signals while the rotatable portion is being rotated during the normal mode.

The control device may comprise a battery for producing a battery voltage. The control circuit may have a power supply for generating a regulated supply voltage and an analog-to-digital converter referenced to the battery voltage. The control circuit may store a magnitude of the regulated supply voltage. The regulated supply voltage may be provided to an input of the analog-to-digital converter. The control circuit may sample the magnitude of the regulated supply voltage at the input of the analog-to-digital converter to generate a measured voltage. The control circuit may calculate the magnitude of the battery voltage using the magnitude of the measured voltage and the stored magnitude of the regulated supply voltage.

The control device may comprise a wireless communication circuit powered from the battery and configured to transmit wireless signals, and at least one LED also powered from the battery. The control circuit may be configured to control the wireless communication circuit to transmit the wireless signals and to control the at least one LED to illuminate the at least one LED in different segments of time within a repeatable time period.

The control circuit is configured to detect a persistent actuation of an actuator of the remote control device (e.g., a continuous rotation of the rotatable portion) after a maximum usage period of persistent adjustment of the first control signal. The control circuit is configured to continue transmitting the wireless signals, but stop illuminating the light bar in response detecting the persistent actuation of the actuator.

DETAILED DESCRIPTION

One or more standard mechanical toggle switches may be replaced by more advanced load control devices (e.g., dimmer switches). Such a load control device may operate to control an amount of power delivered from an alternative current (AC) power source to an electrical load. The procedure of replacing a standard mechanical toggle switch with a load control device typically requires disconnecting electrical wiring, removing the mechanical toggle switch from an electrical wallbox, installing the load control device into the wallbox, and reconnecting the electrical wiring to the load control device. Often, such a procedure is performed by an electrical contractor or other skilled installer. Average consumers may not feel comfortable undertaking the electrical wiring that is necessary to complete installation of a load control device. Accordingly, there is a need for a load control system that may be installed into an existing electrical system that has a mechanical toggle switch, without requiring any electrical wiring work.

Figure 1:
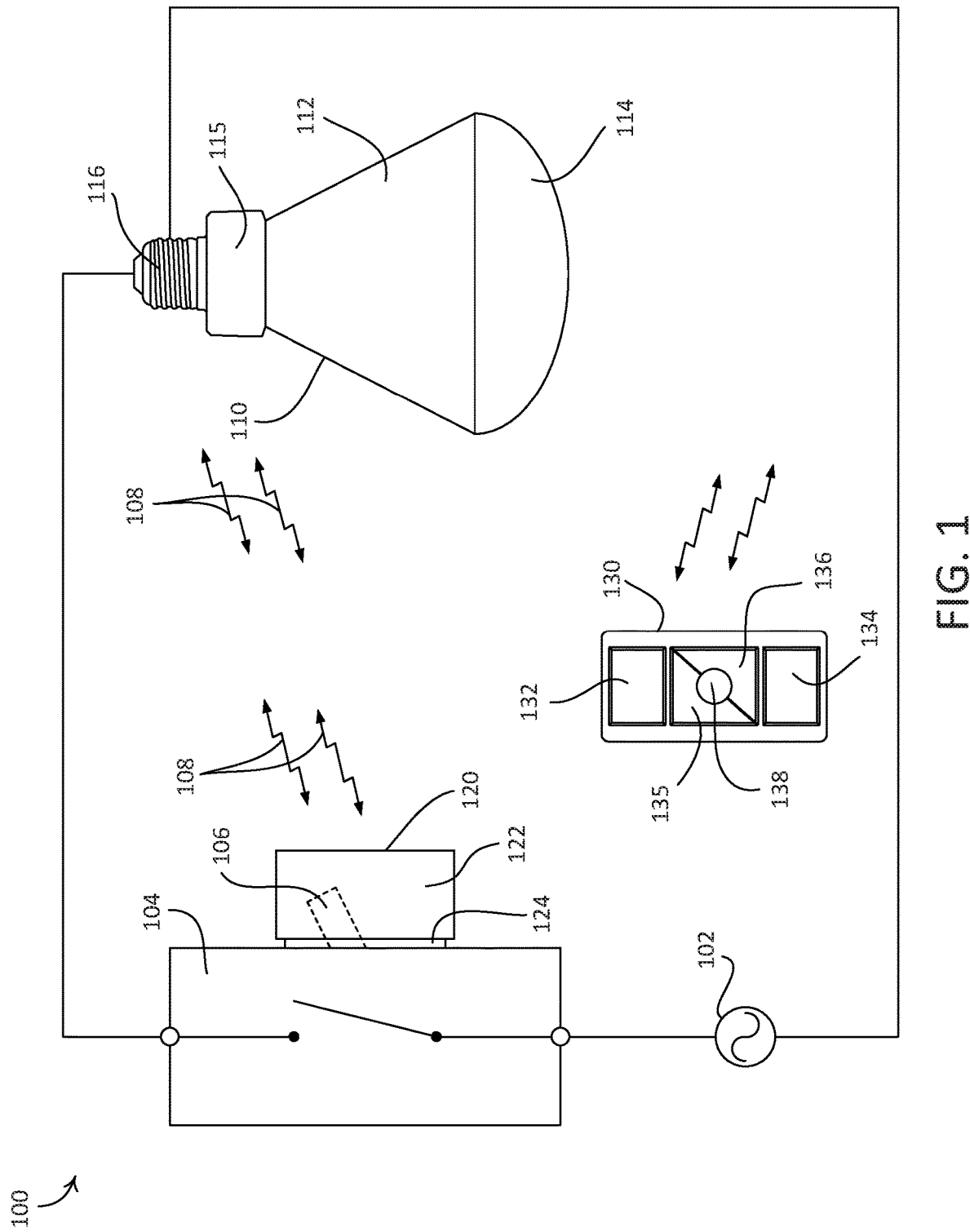
FIG. 1 is a simplified diagram of an example load control system that includes an example retrofit remote control device.

FIG. 1 depicts an example load control system 100. As shown, the load control system 100 is configured as a lighting control system that includes a load control device, such as a controllable light source 110, and a remote control device 120, such as a battery-powered rotary remote control device. The remote control device 120 may include a wireless transmitter. The load control system 100 may include a standard, single pole single throw (SPST) maintained mechanical switch 104 (e.g., a "toggle switch" or a "light switch") that may be in place prior to installation of the remote control device 120. For example, the switch 104 may be pre-existing in the load control system 100 prior to the installation of the remote control device 120. The switch 104 may be electrically coupled in series between an alternating current (AC) power source 102 and the controllable light source 110. The switch 104 may include a toggle actuator 106 that may be actuated to toggle, for example to turn on and/or turn off, the controllable light source 110. The controllable light source 110 may be electrically coupled to the AC power source 102 when the switch 104 is closed (e.g., conductive), and may be disconnected from the AC power source 102 when the switch 104 is open (e.g., nonconductive).

The remote control device 120 may be operable to transmit wireless signals, for example radio frequency (RF) signals 108, to the controllable light source 110 for controlling the intensity of the controllable light source 110. The controllable light source 110 may be associated with the remote control device 120 during a configuration procedure of the load control system 100, such that the controllable light source 110 is then responsive to the RF signals 108 transmitted by the remote control device 120. An example of a configuration procedure for associating a remote control device with a load control device is described in greater detail in commonly-assigned U.S. Patent Publication No. 2008/0111491, published May 15, 2008, entitled "Radio-Frequency Lighting Control System," the entire disclosure of which is hereby incorporated by reference.

The controllable light source 110 may include an internal lighting load (not shown), such as, for example, a light-emitting diode (LED) light engine, a compact fluorescent lamp, an incandescent lamp, a halogen lamp, or other suitable light source. The controllable light source 110 includes a housing 112 that defines an end portion 114 through which light emitted from the lighting load may shine. The controllable light source 110 may include an enclosure 115 that is configured to house one or more electrical components of the controllable light source 110, such as an integral load control circuit (not shown), for controlling the intensity of the lighting load between a low-end intensity (e.g., approximately 1%) and a high-end intensity (e.g., approximately 100%). The controllable light source 110 may include a wireless communication circuit (not shown) housed inside the enclosure 115, such that the controllable light source 110 may be operable to receive the RF signals 108 transmitted by the remote control device 120 and control the intensity of the lighting load in response to the received RF signals. As shown, the enclosure 115 is attached to the housing 112. Alternatively, the enclosure 115 may be integral with, for example monolithic with, the housing 112, such that the enclosure 115 defines an enclosure portion of the housing 112. The controllable light source 110 may include a screw-in base 116 that is configured to be screwed into a standard Edison socket, such that the controllable light source may be coupled to the AC power source 102. The controllable light source 110 may be configured as a downlight (e.g., as shown in FIG. 1) that may be installed in a recessed light fixture. The controllable light source 110 is not limited to the illustrated screw-in base 116, and may include any suitable base, for example a bayonet-style base or other suitable base providing electrical connections.

The load control system 100 may also include one or more other devices configured to wirelessly communicate with the controllable light source 110. As shown, the load control system 100 includes a handheld, battery-powered, remote control device 130 for controlling the controllable light source 110. The remote control device 130 may include one or more buttons, for example, an on button 132, an off button 134, a raise button 135, a lower button 136, and a preset button 138, as shown in FIG. 1. The remote control device 130 may include a wireless communication circuit (not shown) for transmitting digital messages (e.g., including commands to control the lighting load) to the controllable light source 110, for example via the RF signals 108, responsive to actuations of one or more of the buttons 132, 134, 135, 136, and 138. Alternatively, the remote control device 130 may be mounted to a wall or supported by a pedestal, for example a pedestal configured to be mounted on a tabletop. Examples of handheld battery-powered remote controls are described in greater detail in commonly assigned U.S. Pat. No. 8,330,638, issued Dec. 11, 2012, entitled "Wireless Battery Powered Remote Control Having Multiple Mounting Means," and U.S. Pat. No. 7,573,208, issued Aug. 22, 1009, entitled "Method Of Programming A Lighting Preset From A Radio-Frequency Remote Control," the entire disclosures of which are hereby incorporated by reference. Further, the load control system 100 may include with multiple load control devices (e.g., dimmer switches) and/or a system controller, and, for example, the remote control device 120 and/or the remote control device 130 may communicate with one or more load control devices and/or with the system controller (e.g., directly with the system controller), and the system controller may communication with one or more load control devices and/or controllable electrical loads.

The load control system 100 may also include one or more of a remote occupancy sensor or a remote vacancy sensor (not shown) for detecting occupancy and/or vacancy conditions in a space surrounding the sensors. The occupancy or vacancy sensors may be configured to transmit digital messages to the controllable light source 110, for example via RF signals (e.g., the RF signals 108), in response to detecting occupancy or vacancy conditions. Examples of RF load control systems having occupancy and vacancy sensors are described in greater detail in commonly-assigned U.S. Pat. No. 7,940,167, issued May 10, 2011, entitled "Battery Powered Occupancy Sensor," U.S. Pat. No. 8,009,042, issued Aug. 30, 2011, entitled "Radio Frequency Lighting Control System With Occupancy Sensing," and U.S. Pat. No. 8,199,010, issued Jun. 12, 2012, entitled "Method And Apparatus For Configuring A Wireless Sensor," the entire disclosures of which are hereby incorporated by reference.

The load control system 100 may include a remote daylight sensor (not shown) for measuring a total light intensity in the space around the daylight sensor. The daylight sensor may be configured to transmit digital messages, such as a measured light intensity, to the controllable light source 110, for example via RF signal (e.g., the RF signals 108), such that the controllable light source 110 is operable to control the intensity of the lighting load in response to the measured light intensity. Examples of RF load control systems having daylight sensors are described in greater detail in commonly assigned U.S. Pat. No. 8,451, 116, issued May 28, 2013, entitled "Wireless Battery-Powered Daylight Sensor," and U.S. Pat. No. 8,410,706, issued Apr. 2, 2013, entitled "Method Of Calibrating A Daylight Sensor," the entire disclosures of which are hereby incorporated by reference.

The load control system 100 may include other types of input devices, for example, radiometers, cloudy-day sensors, temperature sensors, humidity sensors, pressure sensors, smoke detectors, carbon monoxide detectors, air-quality sensors, security sensors, proximity sensors, fixture sensors, partition sensors, keypads, kinetic or solar-powered remote controls, key fobs, cell phones, smart phones, tablets, personal digital assistants, personal computers, laptops, time clocks, audio-visual controls, safety devices, power monitoring devices (such as power meters, energy meters, utility submeters, utility rate meters), central control transmitters, residential, commercial, or industrial controllers, or any combination of these input devices.

During the configuration procedure of the load control system 100, the controllable light source 110 may be associated with a wireless control device, for example the remote control device 120, by actuating an actuator on the controllable light source 110 and then actuating (e.g., pressing and holding) an actuator on the wireless remote control device (e.g., the rotating portion 122 of the remote control device 120) for a predetermined amount of time (e.g., approximately 10 seconds). Although described with reference to a rotating portion 122, it should be appreciated that the remote control device 120 may include any combination and types of actuators configured to be response to user input, for example, a capacitive touch surface (e.g., and associated capacitive touch sensors), a resistive touch surface (e.g., and associated resistive touch sensors), a magnetic touch surface (e.g., and associated magnetic sensors), a toggle actuator, etc. Further, the rotating portion 122 may include one or more of the additional actuators (e.g., a capacitive touch surface on the front surface of the rotating portion 122, the rotating portion 122 may actuate, and/or the like).

Digital messages transmitted by the remote control device 120, for example directed to the controllable light source 110, may include a command and identifying information, such as a unique identifier (e.g., a serial number) associated with the remote control device 120. After being associated with the remote control device 120, the controllable light source 110 may be responsive to messages containing the unique identifier of the remote control device 120. The controllable light source 110 may be associated with one or more other wireless control devices of the load control system 100, such as one or more of the remote control device 130, the occupancy sensor, the vacancy sensor, and/or the daylight sensor, for example using a similar association process.

After a remote control device, for example the remote control device 120 or the remote control device 130, is associated with the controllable light source 110, the remote control device may be used to associate the controllable light source 110 with the occupancy sensor, the vacancy sensor, and/or the daylight sensor, without actuating the actuator 118 of the controllable light source 110, for example as described in greater detail in commonly-assigned U.S. Patent Application Publication No. 2013/0222122, published Aug. 29, 2013, entitled "Two Part Load Control System Mountable To A Single Electrical Wallbox," the entire disclosure of which is hereby incorporated by reference.

The remote control device 120 may be configured to be attached to the toggle actuator 106 of the switch 104 when the toggle actuator 106 is in the on position (e.g., typically pointing upwards) and the switch 104 is closed and conductive. As shown, the remote control device 120 may include a rotating portion 122 and a base portion 124. The base portion 124 may be configured to be mounted over the toggle actuator 106 of the switch 104. The rotating portion 122 may be supported by the base portion 124 and may be rotatable about the base portion 124.

When the remote control device 120 is mounted over the toggle actuator of a switch (e.g., the toggle actuator 106), the base portion 124 may function to secure the toggle actuator 106 from being toggled. For example, the base portion 124 may be configured to maintain the toggle actuator 106 in an on position, such that a user of the remote control device 120 is not able to mistakenly switch the toggle actuator 106 to the off position, which may disconnect the controllable light source 110 from the AC power source 102, such that controllable light source 110 may not be controlled by one or more remote control devices of the load control system 100 (e.g., the remote control devices 120 and/or 130), which may in turn cause user confusion.

As shown, the remote control device 120 is battery-powered, not wired in series electrical connection between the AC power source 102 and the controllable light source 110 (e.g., does not replace the mechanical switch 104), such that the controllable light source 110 receives a full AC voltage waveform from the AC power source 102, and such that the controllable light source 110 does not receive a phase-control voltage that may be created by a standard dimmer switch. Because the controllable light source 110 receives the full AC voltage waveform, multiple controllable light sources (e.g., controllable light sources 110) may be coupled in parallel on a single electrical circuit (e.g., coupled to the mechanical switch 104). The multiple controllable light sources may include light sources of different types (e.g., incandescent lamps, fluorescent lamps, and/or LED light sources). The remote control device 120 may be configured to control one or more of the multiple controllable light sources, for example substantially in unison. In addition, if there are multiple controllable light sources coupled in parallel on a single circuit, each controllable light source may be zoned, for example to provide individual control of each controllable light source. For example, a first controllable light 110 source may be controlled by the remote control device 120, while a second controllable light source 110 may be controlled by the remote control device 130). In prior art systems, a mechanical switch (such as the switch 104, for example) typically controls such multiple light sources in unison (e.g., turns them on and/or off together).

The remote control device 120 may be part of a larger RF load control system than that depicted in FIG. 1. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and commonly-assigned U.S. Patent Application Publication No. 2009/0206983, published Aug. 20, 2009, entitled "Communication Protocol For A Radio Frequency Load Control System," the entire disclosures of which are incorporated herein by reference.

While the load control system 100 is described herein with reference to the single-pole system shown in FIG. 1, one or both of the controllable light source 110 and the remote control device 120 may be implemented in a "three-way" lighting system having two single-pole double-throw (SPDT) mechanical switches, which may be referred to as "three-way" switches, for controlling a single electrical load.

To illustrate, an example system may comprise two remote control devices 120, with one remote control device 120 connected to the toggle actuator of each SPDT switch. In such a system, the toggle actuators of each SPDT switch may be positioned such that the SPDT switches form a complete circuit between the AC power source 102 and the electrical load 110 before the remote control devices 120 are installed on the toggle actuators.

The load control system 100 shown in FIG. 1 may provide a simple retrofit solution for an existing switched control system. The load control system 100 may provide energy savings and/or advanced control features, for example without requiring any electrical re-wiring and/or without requiring the replacement of any existing mechanical switches. To install and use the load control system 100 of FIG. 1, a consumer may replace an existing lamp with the controllable light source 110, switch the toggle actuator 106 of the mechanical switch 104 to the on position, install (e.g., mount) the remote control device 120 onto the toggle actuator 106, and associate the remote control device 120 and the controllable light source 110 with each other, for example as described above.

It should be appreciated that the load control system 100 need not include the controllable light source 110. For example, in lieu of the controllable light source 110, the load control system 100 may alternatively include a plug-in load control device for controlling an external lighting load. For example, the plug-in load control device may be configured to be plugged into a receptacle of a standard electrical outlet that is electrically connected to an AC power source. The plug-in load control device may have one or more receptacles to which one or more plug-in electrical loads, such a table lamp or a floor lamp, may be plugged. The plug-in load control device may be configured to control the intensity of the lighting loads plugged into the receptacles of the plug-in load control device. It should further be appreciated that the remote control device 120 is not limited to being associated with, and controlling, a single load control device. For example, the remote control device 120 may be configured to control multiple controllable load control devices, for example substantially in unison.

Examples of remote control devices configured to be mounted over existing light switches are described in greater detail in commonly-assigned U.S. Patent Application Publication No. 2014/0117871, published May 4, 2016, and U.S. Patent Application Publication No. 2015/0371534, published Dec. 24, 2015, both entitled "Battery-Powered Retrofit Remote Control Device," the entire disclosures of which are hereby incorporated by reference.

Figure 2:
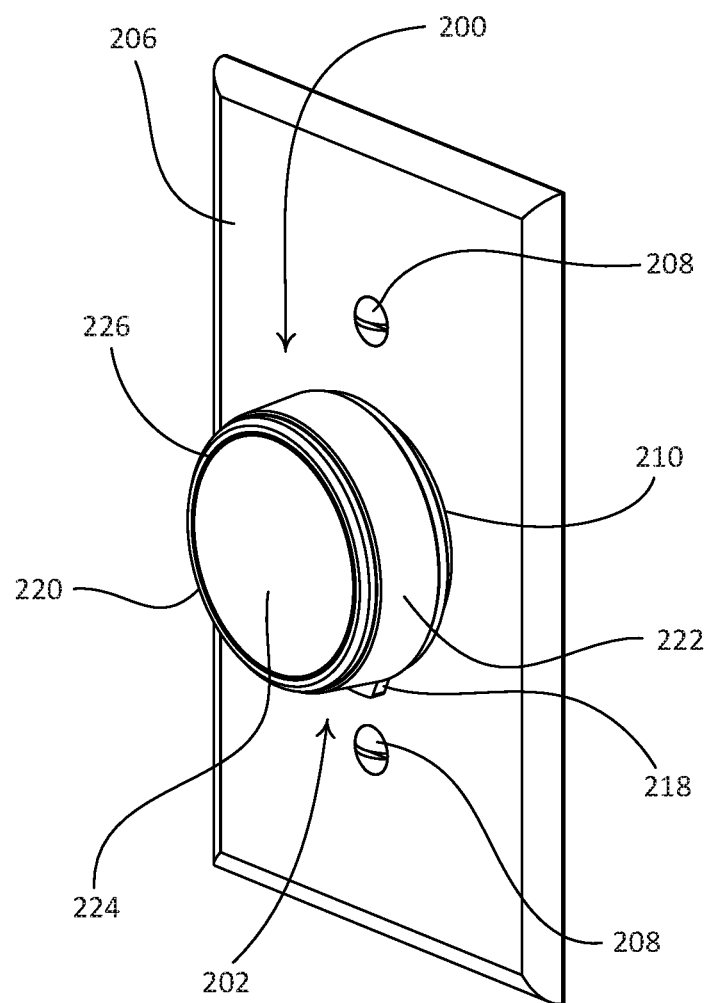
FIG. 2 is a front perspective view of an example retrofit remote control device (e.g., a rotary remote control device)
Figure 3:
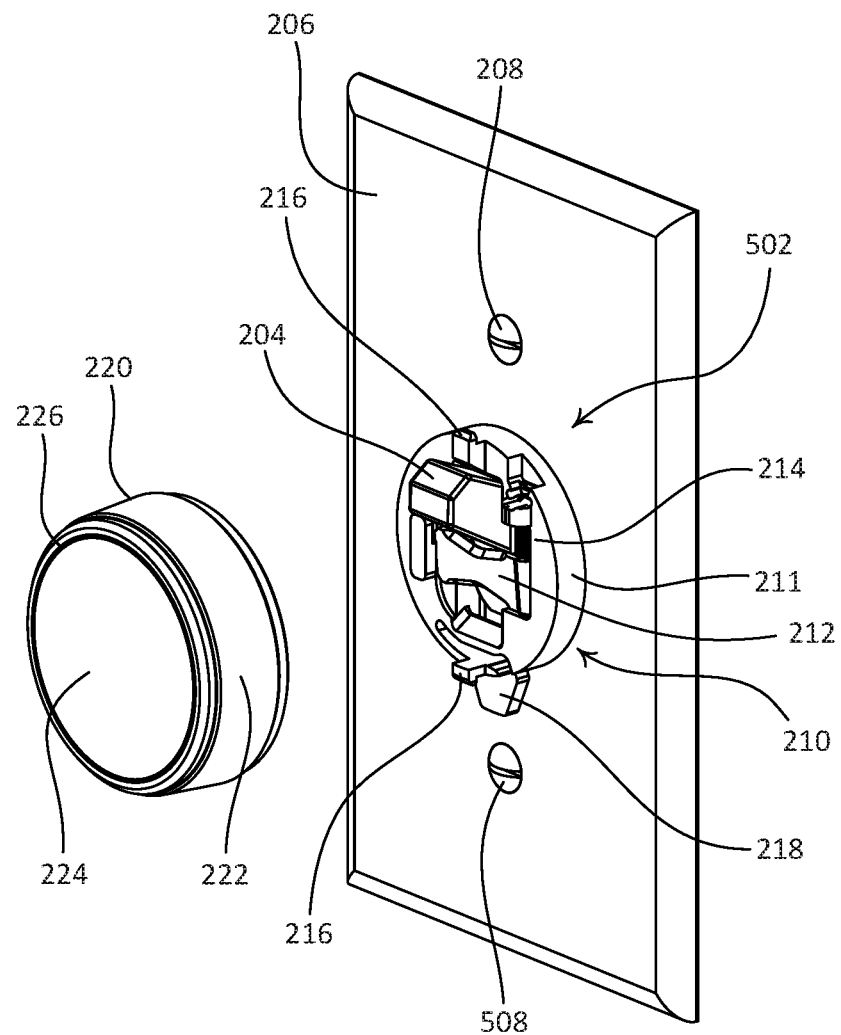
FIG. 3 is a front perspective view of the example retrofit remote control device illustrated in FIG. 2, with a control module of the remote control device removed from a mounting assembly thereof.

FIGS. 2 and 3 depict an example remote control device 200 (e.g., a battery-powered rotary remote control device) that may be deployed, for example, as the remote control device 120 of the load control system 100 shown in FIG. 1. The remote control device 200 may be configured to be mounted over a toggle actuator 204 of a standard light switch 202 (e.g., the toggle actuator 106 of the SPST maintained mechanical switch 104 shown in FIG. 1). The remote control device 200 may be installed over the toggle actuator 204 of an installed light switch 202 without removing a faceplate 206 that is mounted to the light switch 202 (e.g., via faceplate screws 208).

The remote control device 200 may include a mounting assembly 210 and a control module 220 that may be attached to the mounting assembly 210. The mounting assembly 210 may be more generally referred to as a base portion of the remote control device 200. The control module 220 may include a rotating portion that is rotatable with respect to the mounting assembly 210. For example, as shown, the control module 220 includes an annular rotating portion 222 that is configured to rotate about the mounting assembly 210. The remote control device 200 may be configured such that the control module 220 and the mounting assembly 210 are removeably attachable to one another. FIG. 3 depicts the remote control device 200 with the control module 220 detached from the mounting assembly 210.

The mounting assembly 210 may be configured to be fixedly attached to the actuator of a mechanical switch, such as the toggle actuator 204 of the light switch 202, and may be configured to maintain the actuator in the on position. For example, as shown the mounting assembly 210 may include a base 211 that defines a toggle actuator opening 212 that extends there through and that is configured to receive at least a portion of the toggle actuator 204. The mounting assembly 210 may include a bar 212 that may be operably coupled to the base 211, and may be configured to be moveable, for instance translatable, relative to the base 211. The base 211 may be configured to carry a screw 214 that, when driven in a first direction may case the bar 212 to be translated relative to the base 211 such that the bar 212 engages with the toggle actuator 204, thereby fixedly attaching the mounting assembly 210 in position relative to the toggle actuator 204 of the light switch 202 when the toggle actuator 204 is in the up position or the down position. With the mounting assembly 210 so fixed in position, the toggle actuator 204 may be prevented from being switched to the off position. In this regard, a user of the remote control device 200 may be unable to inadvertently switch the light switch 202 off when the remote control device 200 is mounted to the light switch 202.

Figure 4A:
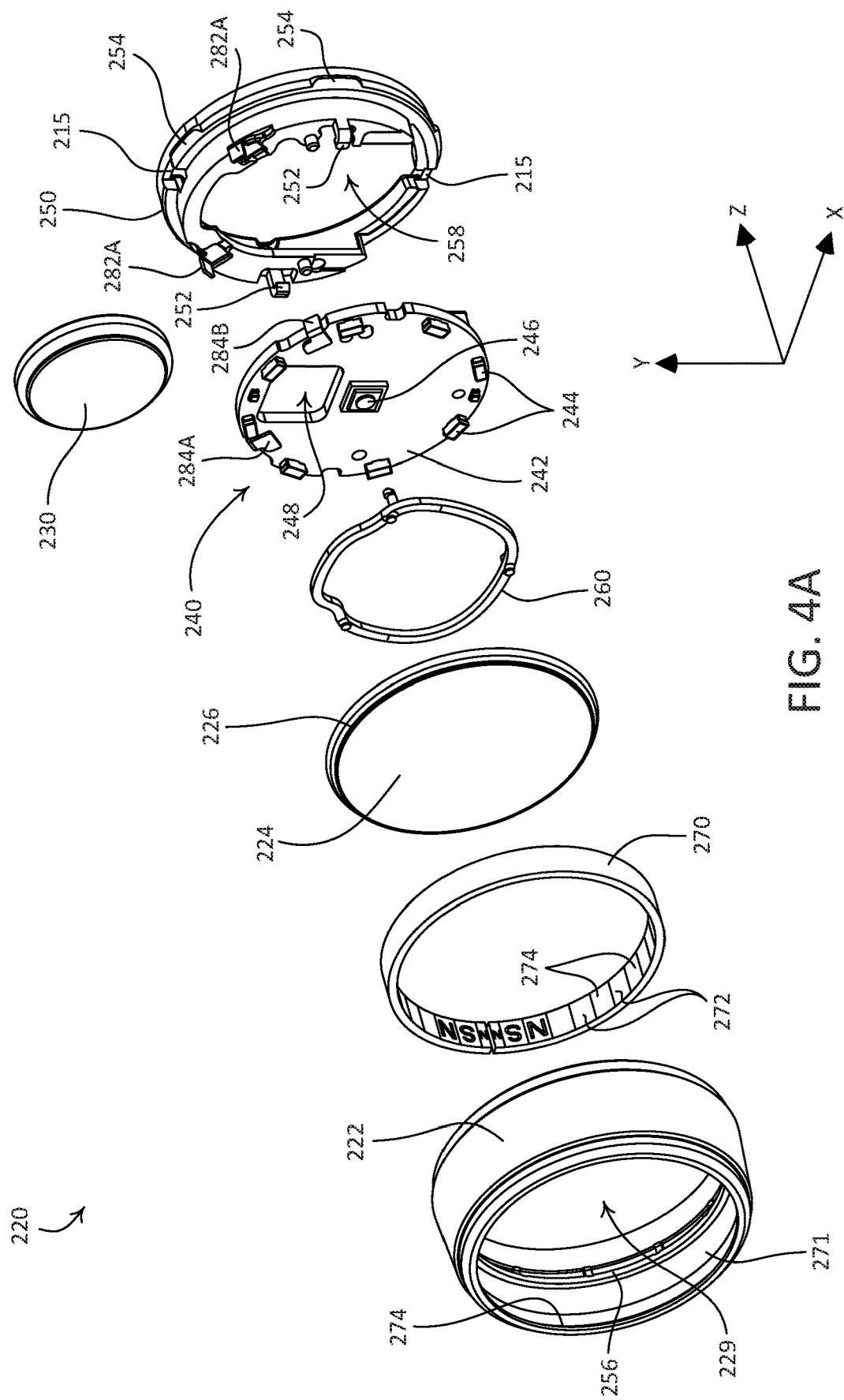
FIG. 4A is a front exploded view of the control module illustrated in FIG. 3.

The remote control device 200 may be configured to enable releasable attachment of the control unit 220 to the mounting assembly 210. The mounting assembly 210 may include one or more engagement features that are configured to engage with complementary engagement features of the control unit 220. For example, the base 211 of the mounting assembly 210 may include resilient snap-fit connectors 216, and the control unit 220 may define corresponding recesses 215 (e.g., as shown in FIG. 4A) that are configured to receive the snap-fit connectors 216. The mounting assembly 210 may include a release mechanism that is operable to cause the control unit 220 to be released from an attached position relative to the mounting assembly 210. As shown, the base 211 of the mounting assembly 210 may include a release tab 218 that may be actuated (e.g., pushed up) to release the control unit 220 from the mounting assembly 210. In another example, the release tab 218 may be pulled down to release the control unit 220 from the mounting assembly 210.

The control module 220 may be attached to the mounting assembly 210 without requiring the release tab 218 to be operated to the release position. Stated differently, the control module 220 may be attached to the mounting assembly when the release tab 218 is in the locking position. For example, the clips of the control module 220 may be configured to resiliently deflect around the locking members of the release tab 218 and to snap into place behind rear edges of the locking members, thereby securing the control module 220 to the mounting assembly 210 in an attached position. The control module 220 may be detached from the mounting assembly 210 (e.g., as shown in FIG. 3), for instance to access one or more batteries 230 (FIG. 4A) that may be used to power the control module 220.

When the control module 220 is attached to the mounting assembly 210 (e.g., as shown in FIG. 2), the rotating portion 222 may be rotatable in opposed directions about the mounting assembly 210, for example in the clockwise or counterclockwise directions. The mounting assembly 210 may be configured to be mounted over the toggle actuator 204 of the light switch 202 such that the application of rotational movement to the rotating portion 222 does not actuate the toggle actuator 204. The remote control device 200 may be configured to be mounted to the toggle actuator 204 both when a "switched up" position of the toggle actuator 204 corresponds to an on position of the light switch 202, and when a "switched down" position of the toggle actuator 204 corresponds to the on position of the light switch 202, while maintaining functionality of the remote control device 200.

The control module 220 may include an actuation portion 224, which may be operated separately from or in concert with the rotating portion 222. As shown, the actuation portion 224 may include a circular surface within an opening defined by the rotating portion 222. In an example implementation, the actuation portion 224 may be configured to move inward towards the light switch 202 to actuate a mechanical switch (not shown) inside the control module 220, for instance as described herein. The actuation portion 224 may be configured to return to an idle or rest position (e.g., as shown in FIG. 2) after being actuated. In this regard, the actuation portion 224 may be configured to operate as a toggle control of the control module 220.

The remote control device 200 may be configured to transmit one or more wireless communication signals (e.g., RF signals 108) to one or more control devices (e.g., the control devices of the load control system 100, such as the controllable light source 110). The remote control device 200 may include a wireless communication circuit, e.g., an RF transceiver or transmitter (not shown), via which one or more wireless communication signals may be sent and/or received. The control module 220 may be configured to transmit digital messages (e.g., including commands) in response to operation of the rotating portion 222 and/or the actuation portion 224. The digital messages may be transmitted to one or more devices associated with the remote control device 200, such as the controllable light source 110. For example, the control module 220 may be configured to transmit a command via one or more RF signals 108 to raise the intensity of the controllable light source 110 in response to a clockwise rotation of the rotating portion 222, and a command to lower the intensity of the controllable light source in response to a counterclockwise rotation of the rotating portion 222. The control module 220 may be configured to transmit a command to toggle the controllable light source 110 (e.g., from off to on or vice versa) in response to an actuation of the actuation portion 224. In addition, the control module 220 may be configured to transmit a command to turn the controllable light source 110 on in response to an actuation of the actuation portion 224 (e.g., if the control module 220 knows that the controllable light source 110 is presently off). The control module 220 may be configured to transmit a command to turn the controllable light source 110 off in response to an actuation of the actuation portion 224 (e.g., if the control module 220 knows that the controllable light source 110 is presently on).

The control module 220 may include a visual indicator, e.g., a light bar 226 located between the rotating portion 222 and the actuation portion 224. For example, the light bar 226 may be define a full circle as shown in FIG. 2. The light bar 226 may be attached to or embedded within a periphery of the actuation portion 224, and may move with the actuation portion 224 when the actuation portion 224 is actuated. The remote control device 200 may provide feedback via the light bar 226, for instance while the rotating portion 222 is being rotated and/or after the remote control device 200 is actuated (e.g., the rotating portion 222 is rotated and/or the actuation portion 224 is actuated). The feedback may indicate, for example, that the remote control device 200 is transmitting one or more RF signals 108. To illustrate, the light bar 226 may be illuminated for a few seconds (e.g., 1-2 seconds) after the remote control device 200 is actuated, and then may be turned off (e.g., to conserve battery life). The light bar 226 may be illuminated to different intensities, for example depending on whether the rotating portion 222 is being rotated to raise or lower the intensity of the lighting load. The light bar 226 may be illuminated to provide feedback of the actual intensity of a lighting load being controlled by the remote control device 200 (e.g., the controllable light source 110).

As described herein, the remote control device 200 may comprise a battery (e.g., such as the battery 230) for powering at least the remote control device 200. The remote control device 200 may be configured to detect a low battery condition and provide an indication of the condition such that a user may be alerted to replace the battery.

Multiple levels of low battery indications may be provided, for example, depending on the amount of power remaining in the battery. For instance, the remote control device 200 may be configured to provide two levels of low battery indications. A first level of indication may be provided when remaining battery power falls below a first threshold (e.g., reaching 20% of full capacity or 80% of battery life). The first level of indication may be provided, for example, by illuminating and/or flashing a portion of the light bar 226 (e.g., a bottom portion of the light bar 226). To distinguish from the illumination used as user feedback and/or to attract a user's attention, the portion of the light bar 226 used to provide the first level of low battery indication may be illuminated in a different color (e.g., red) and/or in a specific pattern (e.g., flashing). The low battery indication may be provided via the light bar 226 regardless of whether the light bar 226 is being used to provide user feedback as described herein. For example, the low battery indication may be provided via the light bar 226 when the light bar 226 is not being used to provide user feedback (e.g., when the actuation portion 224 is not actuated and/or when the rotating portion 222 is not being rotated). The low battery indication may be provided when the light bar 226 is being used to provide user feedback. In such a case, the low battery indication may be distinguished from the user feedback because, for example, the low battery indication is illuminated in a different color (e.g., red) and/or in a specific pattern (e.g., flashing).

Additionally or alternatively, the first level of indication may be provided, for example, by illuminating and/or flashing the bottom portion of the light bar 226, as well as the control module release tab 218. The control module release tab 218, which may be used to remove the control module 220 and obtain access to the battery, may be illuminated. The illumination may be generated by backlighting the control module release tab 218. For example, the control module release tab 218 may comprise a translucent (e.g., transparent, clear, and/or diffusive) material and may be illuminated by one or more light sources (e.g., LEDs) located above and/or to the side of the control module release tab 218 (e.g., inside the control module 220). The illumination may be steady or flashed (e.g., in a blinking manner) such that the low battery condition may be called to a user's attention. Further, by illuminating the control module release tab 218, the mechanism for replacing the battery may be highlighted for the user. The user may actuate the control module release tab 218 (e.g., by pushing up towards the base portion 210 or pulling down away from the base portion 210) to remove the control module 220 from the base portion 210. The user may then remove and replace the battery.

A second level of low battery indication may be provided when the remaining battery power falls below a second threshold. The second threshold may be set to represent a more urgent situation. For example, the threshold may be set at 5% of full capacity or 95% of the battery life. The second level of indication may be provided, for example, by illuminating and/or flashing one or both of the bottom portion of the light bar 226 and the control module release tab 218. Since the battery may be critically low when the second level of low battery indication is generated, the remote control device 200 may be configured to not only provide the low battery indication but also take other measures to conserve battery power. For instance, the remote control device 200 may be configured to stop providing user feedback via the light bar 226 (e.g., to not illuminate the light bar).

Figure 4B:
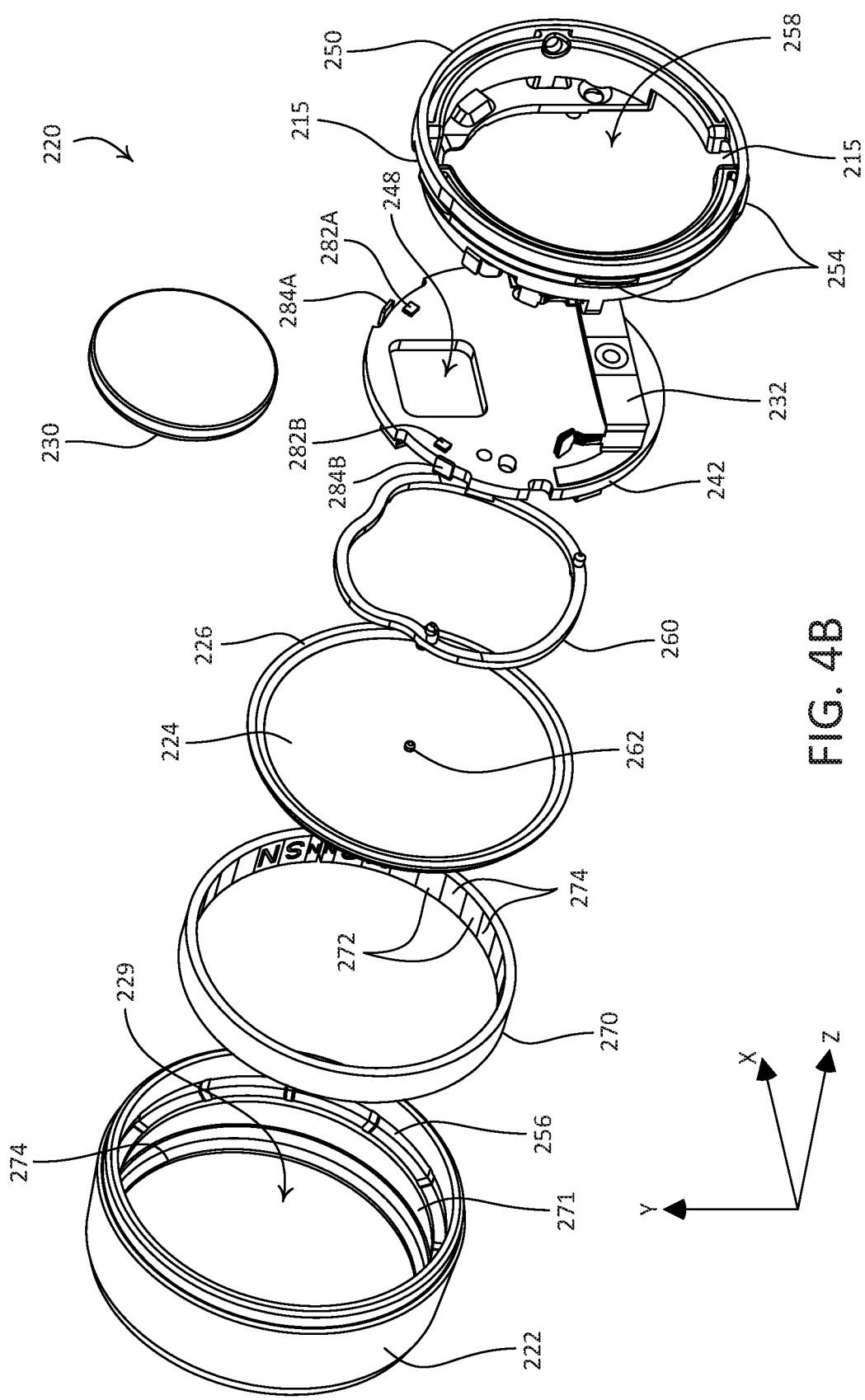
FIG. 4B is a front exploded view of the control module illustrated in FIG. 3.

FIG. 4A is a front exploded view and FIG. 4B is a rear exploded view of the control module 220 of the remote control device 200 shown in FIG. 2. The light bar 226 may be attached to the actuation portion 224 around a periphery of the actuation portion 224. When the actuation portion 224 is received within an opening 229 of the rotating portion 222, the light bar 226 may be located between the actuation portion 224 and the rotating portion 222.

The control module 220 may comprise a printed circuit board (PCB) assembly 240 having a PCB 242. The PCB assembly 240 may comprise a control circuit (not shown) mounted to the PCB 242. The PCB assembly 240 may comprise a plurality of light-emitting diodes (LEDs) 244 (e.g., twelve white LEDs) arranged around the perimeter of the PCB 242 to illuminate the light bar 226. The PCB assembly 240 may include a mechanical tactile switch 246 mounted to a center of the PCB 242. The control module 220 may further comprise a carrier 250 to which the PCB 242 is connected. The PCB 242 may be attached to the carrier 250 via snap-fit connectors 252. The carrier 250 may include a plurality of tabs 254 arranged around a circumference of the carrier 250. The tabs 254 may be configured to be received within corresponding channels 256 defined by the rotating portion 222, to thereby couple the rotating portion 222 to the carrier 250 and allow for rotation of the rotating portion 222 around the carrier 250. As shown, the carrier 250 may define the recesses 215. When the control unit 220 is connected to the mounting assembly, the snap-fit connectors 216 of the mounting assembly 210 may be received in the recesses 215 of the carrier 250.

The carrier 250 and the PCB 242 may remain fixed in position relative to the mounting assembly as the rotating portion 222 is rotated around the carrier 250. The PCB 242 and the carrier 250 may further comprise respective openings 248, 258 that may be configured to receive at least a portion of the toggle actuator 204 of the light switch 202 when the control module 220 is mounted to the mounting assembly 210, such that the rotating portion 322 rotates about the toggle actuator 304 when operated.

The control unit 320 may include a battery retention strap 232 that may be configured to hold the battery 230 in place between the battery retention strap 232 and the PCB 242 of the control unit 220. The control unit 220 may be configured such that the battery 230 is located in space within the control unit 220 that is not occupied by a toggle actuator. When the PCB 242 is connected to the carrier 250, the battery 230 may be located between the PCB 242 and the carrier 350 and may be electrically connected to the control circuit on the PCB 242. The battery retention strap 352 may be configured to operate as a first electrical contact for the battery 230. A second electrical contact may be located on a rear-facing surface of the PCB 242. When the control module 220 is removed from the mounting assembly 210, the battery 230 may be removed from the control module through the opening 258 in the carrier 250.

When the actuation portion 224 is pressed, the actuation portion 224 may move along the z-direction (e.g., towards the mounting assembly 210) until an inner surface of the actuation portion 224 actuates the mechanical tactile switch 248. The control unit 220 may include a resilient return spring 260 that may be located between the actuation portion 224 and the PCB 242. The return spring 260 may be configured to be attached to the PCB 242. The actuation portion 224 may define a projection 262 that extends rearward from an inner surface of the actuation portion 224. When a force is applied to the actuation portion 224 (e.g., when the actuation portion 224 is pressed by a user of the remote control device), the actuation portion 224, and thus the light bar 226, may move in the z-direction until the projection 262 actuates the mechanical tactile switch 246. The return spring 260 may compress under application of the force. When application of the force is ceased (e.g., the user no longer presses the actuation portion 224), the return spring 260 may decompress, thereby to biasing the actuation portion 224 forward such that the actuation portion 224 abuts a rim 274 of the rotating portion 222. In this regard, the return spring 260 may operate to return the actuation portion 224 from an activated (e.g., pressed) position to a rest position.

The control module 220 may further comprise a rotational sensing system, e.g., a magnetic sensing system, such as a Hall-effect sensor system, for determining the rotational speed and direction of rotation of the rotating portion 222. The Hall-effect sensor system may comprise one or more magnetic elements, e.g., a circular magnetic element, such as a magnetic strip. One example of the magnetic strip is a magnetic ring 270, for example, as shown in FIGS. 4A and 4B. The magnetic ring 270 may be located along (e.g., connected to) an inner surface 271 of the rotating portion 222. The magnetic ring 270 may extend around the circumference of the rotating portion 222. The magnetic ring 270 may include a plurality of alternating positive north-pole sections 272 (e.g., labeled with "N" in FIG. 4) and negative south-pole sections 274 (e.g., labeled with "S" in FIG. 4). Alternatively, the control module 220 may comprise a plurality of magnetic elements of alternating position and negative charge arranged on the inner surface 271 of the rotating portion 222.

The rotational sensing system of the control unit 220 may include one or more magnetic sensing circuits, such as Hall-effect sensing circuits. Each Hall-effect sensing circuit may comprise a Hall-effect sensor integrated circuit 280A, 280B that may be mounted on the PCB 242 (e.g., to a rear side of the PCB as shown in FIG. 4B). The magnetic strip 270 may be configured to generate a magnetic field in a first direction (e.g., perpendicular to the z-direction, along the x-y plane), while the Hall-effect sensor integrated circuits 280A, 280B may be responsive to magnetic fields in a second direction (e.g., the z-direction) that is angularly offset from the first direction (e.g., offset by 90 degrees). For example, the Hall-effect sensor integrated circuits 280A, 280B of each Hall-effect sensing circuit may be responsive to magnetic fields directed in the z-direction (e.g., perpendicular to the plane of the PCB 242). The Hall-effect sensor integrated circuits 284A, 284B may be operable to detect passing of the positive and negative sections of the magnetic strip 280 as the rotating portion 222 is rotated about the attachment portion 262. The control circuit of the control unit 220 may be configured to determine a rotational speed and/or direction of rotation of the rotating portion 222 in response to the Hall-effect sensor integrated circuit 284A, 284B.

The magnetic strip 270 may generate magnetic fields in directions perpendicular to the z-direction, e.g., in the x-y plane. Thus, each Hall-effect sensing circuit may further comprise one or more magnetic flux pipe structures 282A, 284A, 282B, 284B for conducting and directing the magnetic fields generated by the magnetic strip 270 to direct the magnetic fields in the z-direction at the Hall-effect sensor integrated circuit 280A, 280B. Each Hall-effect sensor integrated circuit 280A, 280B may be located adjacent to one or more magnetic flux pipe structures 282A, 282B, 284A, 284B. Each magnetic flux pipe structure 282A, 282B, 284A, 284B may be configured to conduct and direct respective magnetic fields generated by the magnetic strip 270 toward corresponding Hall-effect sensor integrated circuit 280A, 280B. For example, the magnetic flux pipe structure 282A and 284A may be configured to conduct and direct respective magnetic fields generated by the magnetic strip 270 toward the Hall-effect sensor integrated circuit 280A, while the magnetic flux pipe structure 282B and 284B may be configured to conduct and direct respective magnetic fields generated by the magnetic strip 270 toward Hall-effect sensor integrated circuit 280B.

As shown, the magnetic flux pipe structures 282A, 282B may be connected to the carrier 250, and the magnetic flux pipe structures 284A, 284B may be mounted to the PCB 242. However, any of the magnetic flux pipe structures 282A, 282B, 284A, 284B may be mounted to any other component of the control unit 220. For example, the magnetic flux pipe structures 282A, 282B may be mounted to (e.g., integral with) the battery retention strap 232. In such instances, the locations of the magnetic flux pipe structures 284A, 284B and the Hall-effect sensor integrated circuit 280A, 280B may move accordingly.

The ring coupling portions of the magnetic flux pipe structures 282A, 282B, 284A, 284B of each of the Hall-effect sensing circuits may be spaced apart by a distance $\theta_{N-S}$. When the ring coupling portions of the magnetic flux pipe structures 282A, 282B, 284A, 284B of one of the Hall-effect sensing circuits are lined up with the centers of two adjacent positive and negative sections of the magnetic strip 270, the ring coupling portions of the magnetic flux pipe structures 282A, 282B, 284A, 284B of the other Hall-effect sensing circuit may be offset from the centers of two other adjacent positive and negative sections of the magnetic strip 270. For example, the ring coupling portions of the other Hall-effect sensing circuit may be offset by an offset distance $\theta_{OS}$ (e.g., one-half of the distance $\theta_{N-S}$) from the centers of the two other adjacent positive and negative sections of the magnetic strip 270. For example, the offset distance $\theta_{OS}$ may be such that when the ring coupling portions of the magnetic flux pipe structures 282A, 282B, 284A, 284B of one of the Hall-effect sensing circuits are lined up with the centers of two adjacent positive and negative sections of the magnetic strip 270, the ring coupling portions of the magnetic flux pipe structures 282A, 282B, 284A, 284B of the other Hall-effect sensing circuit may be lined up with a transition between a positive section and a negative section of the magnetic strip 270.

While the magnetic sensing circuits are shown and described herein as the Hall-effect sensing circuits, the magnetic sensing circuits could be implemented as any type of magnetic sensing circuit, such as, for example, a tunneling magnetoresistance (TMR) sensor, an anisotropic magnetoresistance (AMR) sensor, a giant magnetoresistance (GMR) sensor, a reed switch, or other mechanical magnetic sensor. The output signals of the magnetic sensing circuits may be analog or digital signals. Examples of remote control devices including rotational sensing systems having magnetic flux pipe structures are described in greater detail in commonly-assigned U.S. patent application Ser. No. 15/631,459, filed Jun. 23, 2017, entitled "Magnetic Sensing System for a Rotary Control Device," the entire disclosure of which is hereby incorporated by reference.

Figure 5:
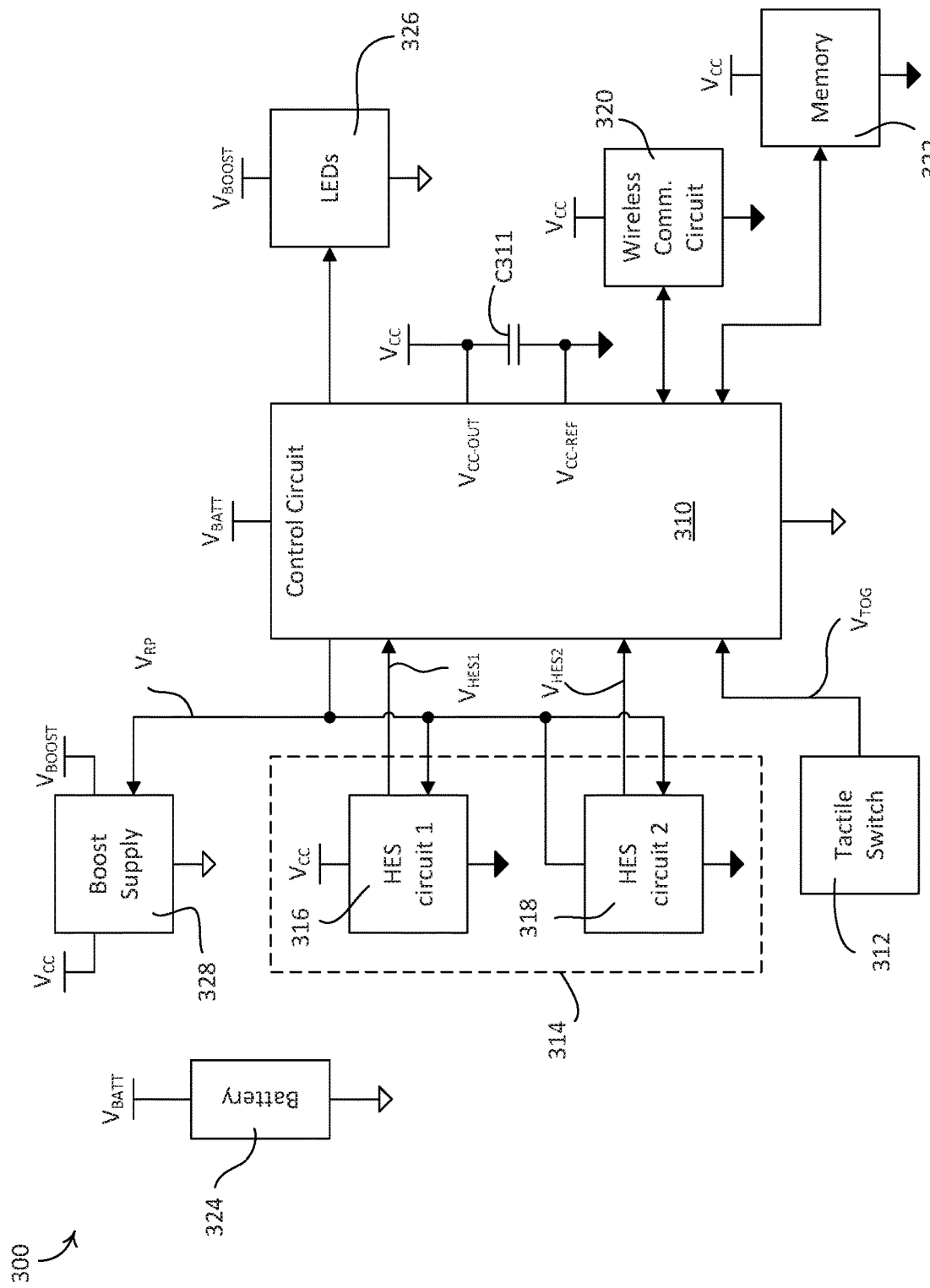
FIG. 5 is a simplified block diagram of an example remote control device.
Figure 12:
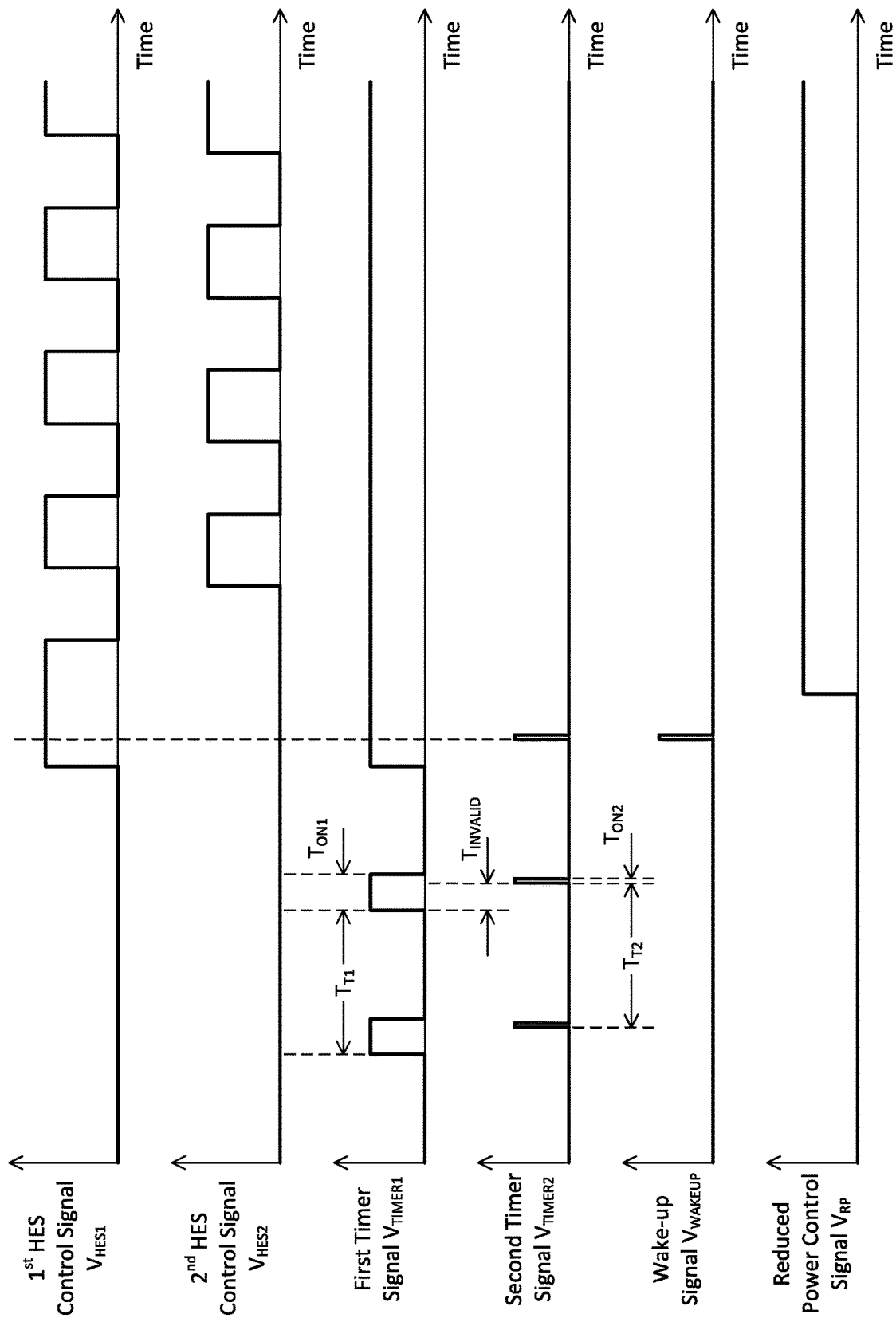
FIG. 12 shows example waveforms illustrating the operation of the wake-up enable circuit of FIG. 11.

FIG. 5 is a simplified block diagram of an example remote control device 300 that may be implemented as, for example, the remote control device 120 shown in FIG. 1 and/or the remote control device 200 shown in FIG. 2. As shown, the remote control device 300 includes a control circuit 310. The control circuit 310 may include one or more of a processor (e.g., a microprocessor), a microcontroller, a programmable logic device (PLD), a field programmable gate array (FPGA), an application specific integrated circuit (ASIC), or any suitable processing device. The control circuit 310 may comprise an internal power supply, e.g., a switching power supply (not shown), for generating a regulated DC supply voltage $V_{CC}$ (e.g., approximately 1.8V) for powering the control circuit and other low-voltage circuitry of the remote control device 300. The supply voltage $V_{CC}$ may be generated across a capacitor C311, which may be coupled between outputs $V_{CC\text{-}OUT}$ and $V_{CC\text{-}REF}$ of the control circuit 310 as shown in FIG. 12.

The remote control device 300 may comprise a tactile switch 312 that may be coupled to the control circuit 310. The tactile switch 312 may be actuated in response to actuations of the actuation portion 224 of the control module 220. The tactile switch 312 may generate a toggle control signal $V_{TOG}$ that may be representative of instances when the actuation portion 224 of the control module 220 is pushed towards the mounting assembly 210, so as to toggle a controlled electrical load on and/or off.

The remote control device 300 may further comprise a rotational sensing circuit 314 including one or more magnetic sensing circuits, for example, a first Hall-effect sensing (HES) circuit 316 and a second Hall-effect sensing (HES) circuit 318 as shown in FIG. 5. The first and second Hall-effect sensing circuits 316, 318 may represent the Hall-effect sensing circuits 280 described above. For example, each of the first and second Hall-effect sensing circuit 316, 318 may comprises a Hall-effect sensor integrated circuit 282 and two magnetic flux pipe structures 286, 288. The Hall-effect sensing circuits 316, 318 may be configured to detect the magnetic fields generated by a circular magnetic element (e.g., the magnetic ring 270) coupled to a rotary knob (e.g., the rotating portion 222 of the control module 220). The first Hall-effect sensing circuit 316 may generate a first HES output signal $V_{HES1}$ and the second Hall-effect sensing circuit 318 may generate a second HES output signal $V_{HES2}$. The first and second HES output signals $V_{HES1}$, $V_{HES2}$ may, in combination, be representative of an angular velocity ω at which the rotating portion 222 is rotated and/or an angular direction (e.g., clockwise or counter-clockwise) in which the rotating portion 222 is rotated. The control circuit 310 may be configured to determine the angular velocity ω and/or the angular direction of the rotating portion 222 in response to the first and second HES output signals $V_{HES1}$, $V_{HES2}$. If the remote control device 300 comprises a single magnetic sensing circuit (e.g., just the first Hall-effect sensing circuit 316), the control circuit 310 may be configured to determine the angular velocity ω of the rotating portion 222 in response to the first HES output signal $V_{HES1}$.

Alternatively or additionally, the remote control device 300 may include a single integrated circuit having two internal Hall-effect sensing circuits. In addition, while the magnetic sensing circuits are shown as the first and second Hall-effect sensing circuits 316, 318 in FIG. 5, the magnetic sensing circuits could be implemented as any type of magnetic sensing circuit, such as, for example, a tunneling magnetoresistance (TMR) sensor, an anisotropic magnetoresistance (AMR) sensor, a giant magnetoresistance (GMR) sensor, a reed switch, or other mechanical magnetic sensor. Further, while the remote control device 300 is illustrated as including magnetic sensing circuits, the remote control device 300 may include non-magnetic sensing circuits, such as a capacitive touch sensing circuit, a resistive touch sensing circuit, an accelerometer, etc., additionally or alternatively to the magnetic sensing circuits. The output signals of the magnetic sensing circuits (e.g., the first and second HES output signals $V_{HES1}$, $V_{HES2}$) may be analog or digital signals.

The first and second Hall-effect sensing circuits 316, 318 (e.g., the Hall-effect sensor integrated circuits of each of the first and second Hall-effect sensing circuits) may be configured to operate in a high-speed mode during which the Hall-effect sensing circuits 316, 318 may sample the magnetic fields generated by the magnetic ring 270 at a first sampling rate that causes the Hall-effect sensing circuits 316, 318 to be very responsive to changes in the magnetic fields generated by the magnetic ring 270. When the Hall-effect sensing circuits 316, 318 are operating in the high-speed mode, the control circuit 310 may be configured to determine the angular velocity ω and/or the angular direction of the rotating portion 222. The first and second Hall-effect sensing circuits 316, 318 may also be configured to operate in a low-speed mode during which the Hall-effect sensing circuits may sample the magnetic fields generated by the magnetic ring 270 at a second sampling rate that is less than the first sampling rate during the high-speed mode, which causes the Hall-effect sensing circuits to be less responsive to changes in the magnetic fields generated by the magnetic ring 270 and the Hall-effect sensing circuits consume less power than in the high-speed mode. During the low-speed mode, the control circuit 310 may, for example, be able to determine whether the rotating portion 222 is being rotated.

The remote control device 300 may also include a wireless communication circuit 320, for example an RF transmitter coupled to an antenna, for transmitting wireless signals, such as the RF signals 108, in response to the control circuit 310 receiving the first and second HES output signals $V_{HES1}$, $V_{HES2}$ (e.g., based on rotations of the rotating portion 222) and receiving the toggle control signal $V_{TOG}$ (e.g., based on actuations of the actuation portion 224). The control circuit 310 may cause the wireless communication circuit 320 to transmit digital messages via one or more wireless signals to an associated load control device, for example the controllable light source 110 shown in FIG. 1. Alternatively or additionally, the wireless communication circuit 320 may include an RF receiver for receiving RF signals, an RF transceiver for transmitting and receiving RF signals, or an infrared (IR) receiver for receiving IR signals. The control circuit 310 may, responsive to receiving one or more of the toggle control signal $V_{TOG}$ and the first and second HES output signals $V_{HES1}$, $V_{HES2}$, cause the wireless communication circuit 320 to transmit one or more signals, for example RF signals 108, to a controllable light source associated with the rotary remote control device 300, for example the lighting load of the controllable light source 110 shown in FIG. 1.

The remote control device 300 may also include a battery 324 for producing a battery voltage $V_{BATT}$ that may be used to power one or more of the control circuit 310, the rotational sensing circuit 314, the wireless communication circuit 320, and other low-voltage circuitry of the remote control device 300. The remote control device 300 may also include a memory 322 communicatively coupled to the control circuit 310. The memory 322 may be implemented as an external integrated circuit (IC) or as an internal circuit of the control circuit 310. The control circuit 310 may be configured to use the memory 322 for the storage and/or retrieval of, for example, a unique identifier (e.g., a serial number) of the remote control device 300 that may be included in the transmitted RF signals.

The remote control device 300 may include one or more visual indicators, for example, one or more LEDs 326 (e.g., the LEDs 246 of the control module 220 shown in FIG. 4), which are configured to provide feedback to a user of the remote control device 300. For example, the LEDs 326 may be configured to illuminate the light bar 226. The LEDs 326 may be operatively coupled to the control circuit 310. The control circuit 310 may be configured to pulse-width modulate the LEDs 326 and may be configured to only illuminate a subset of the LEDs at a single time to reduce the peak current conducted through the battery 324. For example, the control circuit 310 may be configured to illuminate three LEDs at a time. The control circuit 310 may control the LEDs 326 to provide feedback indicating a status of the controllable light source 110, for example if the controllable light source 110 is on, off, or a present intensity of the controllable light source 110. The control circuit 310 may be configured to illuminate the LEDs 326 to provide feedback while the rotating portion 222 is being rotated. After detecting the end of a rotation of the rotating portion 222, the control circuit 310 may be configured to keep the LEDs 326 illuminated for a first predetermined period of time (e.g., approximately 1 second) and then fade (e.g., dim) the LEDs to off over a second predetermined period of time (e.g., approximately 1.5 seconds).

The remote control device 300 may comprise a converter circuit, e.g., a boost power supply 328, which may receive the supply voltage $V_{CC}$ and generate a boosted DC voltage $V_{BOOST}$. The boosted DC voltage $V_{BOOST}$ may have a magnitude greater than the magnitude of the supply voltage $V_{CC}$ for driving the LEDs 326 (e.g., approximately 2.6-2.8 volts). The boost power supply 328 may be configured to be enabled and disabled such that the boost power supply 328 only generates the boosted voltage $V_{BOOST}$ when the LEDs 326 need to be illuminated (e.g., when the rotating portion 222 is being rotated or when the actuation portion 224 is actuated). Additionally or alternatively, the converter circuit of the remote control device 300 may comprise an inverter circuit for generating a negative DC voltage $V_{CC-NEG}$ (e.g., −1.8 volts) from the supply voltage $V_{CC}$, and the LEDs may be coupled between the supply voltage $V_{CC}$ and the negative DC voltage $V_{CC-NEG}$.

Figure 6A:
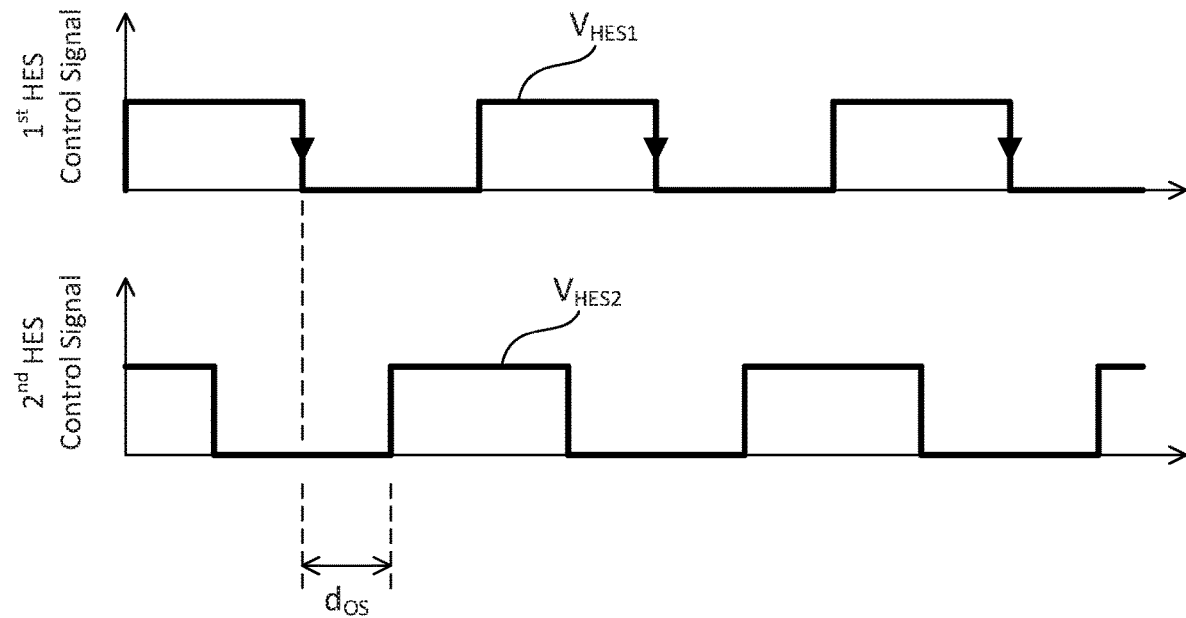
FIG. 6A depicts a first encoder control signal and a second encoder control signal when an example rotary remote control device is actuated along a first direction.
Figure 6B:
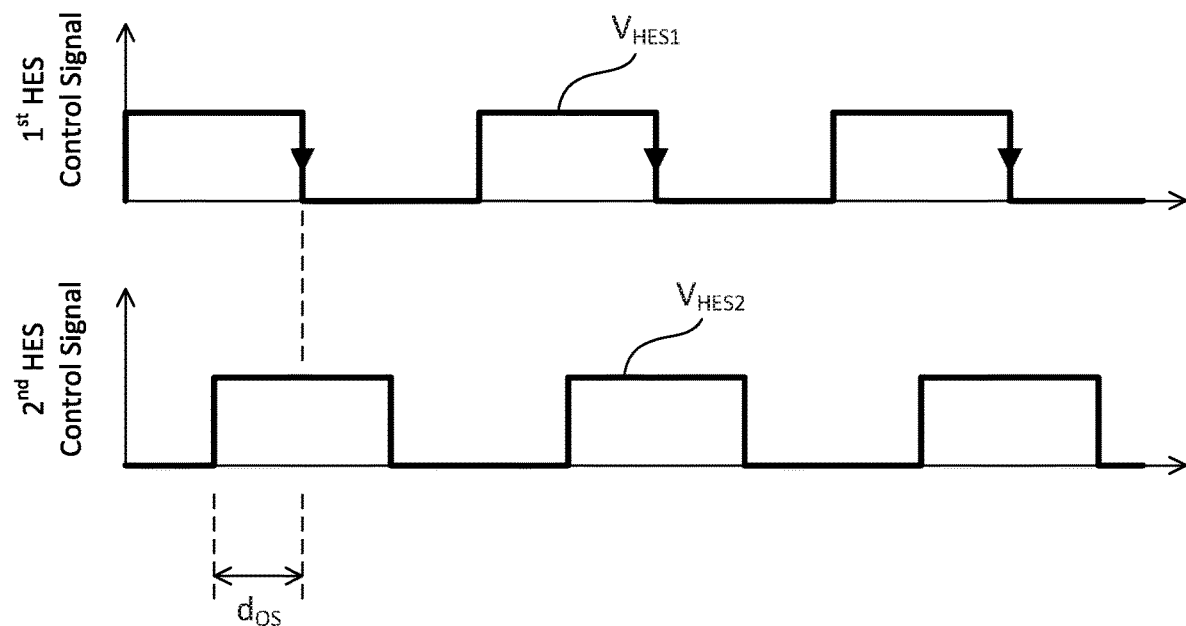
FIG. 6B depicts a first encoder control signal and a second encoder control signal when an example rotary remote control device is actuated along a second direction.

FIG. 6A is a simplified diagram showing example waveforms of the first HES output signal $V_{HES1}$ and the second HES output signal $V_{HES2}$ when the rotating portion 222 is being rotated in the clockwise direction. The first HES output signal $V_{HES1}$ may lag the second HES output signal $V_{HES2}$ by an offset distance $d_{OS}$ (e.g., one-half of the distance $d_{N-S}$) when the rotating portion 222 is rotated clockwise. FIG. 6B is a simplified diagram showing example waveforms of the first HES output signal $V_{HES1}$ and the second HES output signal $V_{HES2}$ when the rotating portion 222 is being rotated in the counter-clockwise direction. The second HES output signal $V_{HES2}$ may lag the first HES output signal $V_{HES1}$ by the offset distance $d_{OS}$ when the rotating portion 222 is rotated counter-clockwise. The control circuit 310 may be configured to determine whether the second HES output signal $V_{HES2}$ is low (e.g., at approximately circuit common) or high (e.g., at approximately the battery voltage $V_{BATT}$) at the times of the falling edges of the first HES output signal $V_{HES1}$ (e.g., when the first HES output signal $V_{HES1}$ transitions from high to low), in order to determine whether the rotating portion 222 is being rotated clockwise or counter-clockwise, respectively.

The lag between the first HES output signal $V_{HES1}$ and the second HES output signal $V_{HES2}$ may be based on the offset of the ring coupling portion of the Hall-effect sensing circuits 316, 318 from the centers of the two other adjacent positive and negative sections of the magnetic strip. For example, the distance $d_{OS}$ (e.g., one-half of the distance $d_{N-S}$) may be such that when the ring coupling portions 290 of the magnetic flux pipe structures 286, 288 of one of the Hall-effect sensing circuits 280 are lined up with the centers of two adjacent positive and negative sections 272, 274 of the magnetic strip 270, the ring coupling portions 290 of the other Hall-effect sensing circuit 280 may be lined up with a transition between a positive section 272 and a negative section 274 of the magnetic strip 270.

In FIGS. 6A and 6B, the down arrow may indicate a transition from a positive section 272 to a negative section 274 of the magnetic strip 270. Further, an entire period as shown in FIGS. 6A and 6B is from one pole to the same pole, for example, from a positive section 272 of the magnetic strip 270 to a subsequent positive section 272 of the magnetic strip 270. The distance $d_{N-S}$ may be a half period, from a positive pole to a negative pole, and the offset distance $d_{OS}$ may be one-fourth of the period (e.g., 90 degrees).

The control circuit 310 may be configured to operate the remote control device 300 in a normal mode (e.g., an active mode) in response to rotations of the rotating portion 222 and/or in response to actuations of the actuation portion 224. In the normal mode, the control circuit 310 may be configured to monitor the Hall-effect sensing circuits 316, 318 to determine the angular velocity ω and the angular direction of the rotating portion 222. In addition, the control circuit 310 may be configured to transmit digital messages via the wireless communication circuit 320 in the normal mode (e.g., while the rotating portion 222 is being rotated and/or in response to actuations of the actuation portion 224). Further, the control circuit 310 may be configured to enable the boost power supply 328 and illuminate the LEDs 326 in the normal mode.

The control circuit 310 may be configured to operate the remote control device 300 in a reduced-power mode (e.g., an idle mode) when the when the rotating portion 222 and the actuation portion 224 are not being actuated. When operating in the reduced-power mode, the remote control device 300 may consume less power than when operating in the normal mode to conserve battery life. For example, when in the reduced-power mode, the control circuit 310 may be configured to turn off the LEDs 326, disable the boost power supply 328, and/or change a processing unit (e.g., a CPU) of the control circuit 310 from an active state to a sleep state.

Further, the control circuit 310 may change the Hall-effect sensing circuits 316, 318 to the low-speed mode and/or disable one of the Hall-effect sensing circuits 316, 318 when operating the remote control device 300 in the reduced-power mode. Moreover, it should be appreciated that, in some examples, the processing unit of the control circuit 310 is in the active state when the remote control device 300 is operating in the normal mode, but may be in the active state or in the sleep state when the remote control device 300 is operating in the reduced-power mode.

The lifetime of the battery 324 may be dependent upon the amount of time that the control circuit 310 operates in the reduced-power mode rather than the normal mode. Since the rotating portion 222 and/or the actuation portion 224 may only be actuated a few times a day, the lifetime of the battery 724 may be significantly lengthened by having the control circuit 310 operate in the reduced-power mode when the rotating portion 222 is idle. However, frequent actuations of the rotating portion 222 and/or the actuation portion 224, particularly, persistent actuations within a short period of time, may reduce the lifetime of the battery 324. For example, persistent actuations may comprise a continuous rotation (or a number of rotations within a short period of time) of the rotating portion and/or a continuous or repetitive actuation of the actuation portion 224 that cause the control circuit 310 to operate in the normal mode for long periods of time.

The control circuit 310 may generate a reduced power control signal $V_{RP}$ for controlling the remote control device 300 between the normal mode and the reduced-power mode. For example, the control circuit 310 may be configured to enter the normal mode by driving the reduced power control signal $V_{RP}$ high (e.g., towards the supply voltage $V_{CC}$) and to enter the reduced-power mode by driving the reduced power control signal $V_{RP}$ low (e.g., towards circuit common). As shown in FIG. 12, the second Hall-effect sensing circuit 318 may be powered by the reduced power control signal $V_{RP}$ (e.g., through a pin on a processing device of the control circuit 310). The control circuit 310 may be configured to enable the second Hall-effect sensing circuit 318 by driving the reduced power control signal $V_{RP}$ high towards the supply voltage $V_{CC}$, and disable the second Hall-effect sensing circuit by driving the reduced power control signal $V_{RP}$ low towards circuit common. The reduced power control signal $V_{RP}$ may also be received at enable pins of the Hall-effect sensor integrated circuits of one or each of the first and second Hall-effect sensing circuits 316, 318. The control circuit 310 may change the Hall-effect sensing circuits 316, 318 between the low-speed and high-speed modes using the reduced power control signal $V_{RP}$. The control circuit 310 may also enable and disable the boost power supply 328 using the reduced power control signal $V_{RP}$. Accordingly, the control circuit 310 (e.g., the processing device of the control circuit) only needs to use one output pin to enable and disable the second Hall-effect sensing circuit 318, change the Hall-effect sensing circuits 316, 318 between the low-speed and high-speed modes, and/or enable and disable the boost power supply 328, in any combination.

When the rotating portion 222 and the actuation portion 224 are not being actuated, the control circuit 310 may operate the remote control device 300 in the reduced-power mode. In the reduced-power mode, the control circuit 310 may disable the second Hall-effect sensing circuit 318, put at least the first Hall-effect sensing circuit 316 in the low-speed mode, and/or disable the boost power supply 328 by driving the reduced power control signal $V_{RP}$ low towards circuit common. During the reduced-power mode, the control circuit 310 may be configured to detect a first new movement (e.g., rotation) of the rotating portion 222 in response to the first HES output signal $V_{HES1}$ while the first Hall-effect sensing circuit 316 is in the low-speed mode. After detecting a first new movement of the rotating portion 222, the control circuit 310 may drive the reduced power control signal $V_{RP}$ high towards the supply voltage $V_{CC}$ to enable the second Hall-effect sensing circuit 318 and put both of the first and second Hall-effect sensing circuits 316, 318 in the high-speed mode, such that the control circuit 310 is able to determine the angular velocity ω and the angular direction of the rotating portion 222 in response to the first and second HES output signals $V_{HES1}$, $V_{HES2}$. The control circuit 310 may also enable the boost power supply 328 by driving the reduced power control signal $V_{RP}$ high towards the supply voltage $V_{CC}$ and illuminate the LEDs 328 while the rotating portion 222 is being rotated. Actuation of the actuation portion may actuate the mechanical tactile switch 312, which may cause the control circuit 310 to control the reduced power control signal $V_{RP}$ to enable the converter circuit (e.g., a boost power supply 328).

Figure 7:
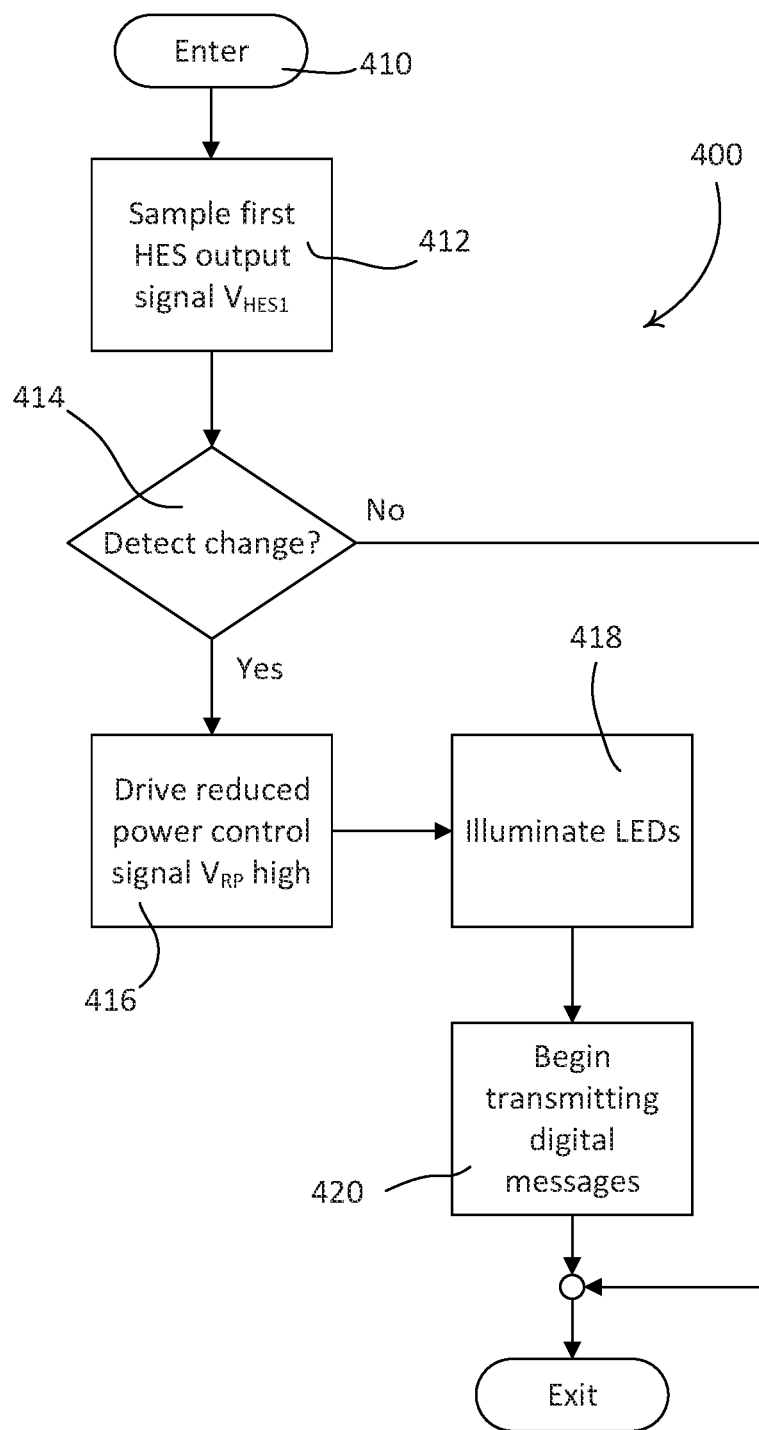
FIG. 7 is a simplified flowchart of an example wake-up procedure that may be executed by a control circuit of a remote control device.

FIG. 7 is a simplified flowchart of an example wake-up procedure 400 that may be executed by a control circuit of a remote control device (e.g., the control circuit 310 of the remote control device 300 shown in FIG. 5) in order to detect the movement of an actuator (e.g., the rotating portion 222). For example, the control circuit may be configured to operate in a reduced-power mode when the rotating portion 222 is not being rotated. The wake-up procedure 400 may be executed periodically at 410 in the reduced-power mode. At 412, the control circuit may be configured to sample the first HES output signal $V_{HES1}$, which may be generated by the first Hall-effect sensing circuit 318 while operating in the low-speed mode. As previously mentioned, the control circuit may be configured to detect rotation of the rotating portion by detecting the positive and negative sections 272, 274 of the magnetic strip 270 passing the first Hall-effect sensing circuit 318. The control circuit may be configured to detect a change in the position of the rotating portion 222 if the sample of the first HES output signal $V_{HES1}$ has changed (e.g., from high to low, or vice versa). If the control circuit does not detect a change in the position of the rotating portion 222 at 414, the wake-up procedure 400 simply exits. If the control circuit detects a change in the position of the rotating portion 222 at 414, the control circuit may drive the reduced power control signal $V_{RP}$ high to control the remote control device 300 to enter the normal mode at 416, illuminate the LEDs 328 at 418, and begin transmitting wireless signals for controlling the associated load control devices via the wireless communication circuit 320 at 420, before the wake-up procedure 400 exits.

The control circuit 310 may be configured to turn off the LEDs 328 in response to the detection of a persistent actuation of an actuator of the remote control device 300, for example, to save battery life. Referring back to FIG. 5, the control circuit 310 may be configured to turn off the LEDs 328 in response to the detection of persistent actuations of the rotating portion 222 and/or the actuation portion 224 during a period of time (e.g., a short period of time). For example, the control circuit 310 may be configured to keep track of the amount of time that the rotating portion 222 has been rotated during a persistent or continuous rotation (e.g., a nearly continuous rotations) and may turn off the LEDs 328 after a usage timer exceeds a maximum usage period $T_{MAX-USAGE}$. The maximum usage period $T_{MAX-USAGE}$ may be sized to be slightly longer than a typical rotation of the rotating portion 222 when the rotating portion 222 is rotated to adjust the intensity of the associated load control devices between the minimum intensity and the maximum intensity (e.g., approximately ten seconds). The control circuit 310 may be configured to accumulate the time of a continuous rotations and/or various rotations until the maximum usage period $T_{MAX-USAGE}$ is exceeded. The control circuit 310 may be configured to reset the usage timer when a timeout timer exceeds a maximum timeout period $T_{MAX-TIMEOUT}$ (e.g., approximately thirty seconds).

Figure 8:
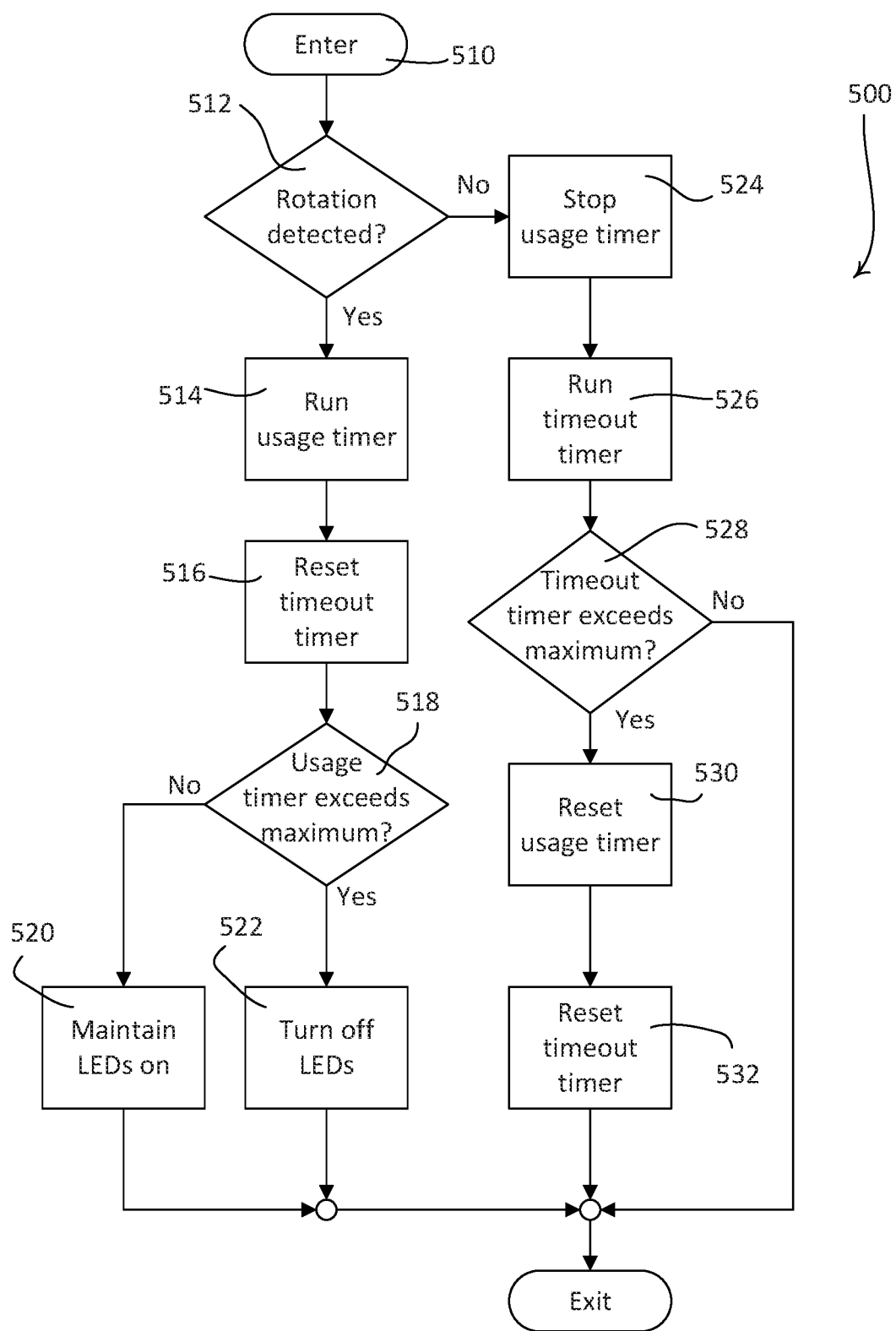
FIG. 8 is a simplified flowchart of an example usage detection procedure that may be executed by a control circuit of a remote control device.

FIG. 8 is a simplified flowchart of an example usage detection procedure 500 that may be executed by a control circuit of a remote control device (e.g., the control circuit 310 of the remote control device 300 shown in FIG. 5). The control circuit may execute the usage detection procedure 500 periodically at 510 to detect persistent rotations (e.g., continuous rotations) of the rotating portion 222 and turn off the LEDs 328. If rotation is detected at 512, the control circuit may run the usage timer at 514 and reset the timeout timer at step 516. If the usage timer does not exceed the maximum usage period $T_{MAX-USAGE}$ at 518, then the control circuit may keep maintain the LEDs in an on state at 520 and the usage detection procedure 500 exits. The control circuit may turn the LEDs on upon detecting rotation, for example, in accordance with another procedure (e.g., a rotation or actuation detection procedure). If the usage timer exceeds the maximum usage period $T_{MAX-USAGE}$ at 518, the control circuit may turn off the LEDs at 522 (e.g., maintain the LEDs in an off state) and the usage detection procedure 500 exits. After the usage detection procedure 500 exits, if rotation is again detected at 512 the next time the control circuit executes the usage detection procedure 500 (e.g., if a user is persistently rotating the rotating portion 222), the control circuit will again determine if the usage timer exceeds the maximum usage period $T_{MAX-USAGE}$ at 518, and if so, the control circuit will ensure the LEDs are off at 522, for example, to conserve battery life.

If rotation of the rotating portion 222 is not detected at 512, the control circuit may stop the usage timer at 524 and run the timeout timer at 526. If the timeout timer does not exceed the maximum timeout period $T_{MAX-TIMEOUT}$ at 528, the usage detection procedure 500 exits. It should be noted that in such instances, the usage timer is stopped at 524, but not reset. As such, if rotation is detected the next time the usage detection procedure 500 is executed, the control circuit will run (e.g., restart) the usage timer at 514, reset the timeout timer at 516, and determine whether the usage timer exceeds the maximum usage period $T_{MAX-USAGE}$ at 518. If the timeout timer exceeds the maximum timeout period $T_{MAX-TIMEOUT}$ at 528, the control circuit may reset the usage timer at 530 and reset the timeout timer at 532, before the usage detection procedure 500 exits. For example, resetting the usage timer at 530 may ensure that the usage detection procedure 500 does not instruct the control circuit to turn off the LEDs at 522 during subsequent executions of the usage detection procedure 500 (e.g., during instances where the LEDs should, in fact, be kept on, for example, in accordance with another procedure, such as a rotation or actuation detection procedure). Finally, it should be appreciated that the usage detection procedure 500 may be configured to detect any number and/or type of actuations at 512, and is not limited to the detection of rotations of a rotating portion 222.

Referring back to FIG. 5, the control circuit 310 may be configured to selectively power circuits and complete power-consuming tasks in order to reduce the instantaneous power consumed by the battery 324 (e.g., to limit the peak power). The control circuit 310 may be configured to control one or more circuits and/or perform one or more tasks in different segments of time within a repeatable time period. For example, the control circuit 310 may be configured such that the control circuit does not illuminate the LEDs 326 at the same time that the control circuit is transmitting a digital message via the wireless communication circuit 320. Accordingly, the control circuit 310 may be configured to control the wireless communication circuit to transmit the wireless signals and to control the at least one of the LEDs 326 to illuminate the LED in different segments of time within the repeatable time period. The control circuit 310 may be configured to power circuits and/or complete power-consuming tasks during other segments of time within the repeatable time period (e.g., in addition to or in lieu of illuminating the LEDs 326 and/or transmitting the digital messages). For example, other power-consuming tasks may occur when the analog-to-digital converter of the control circuit 310 is sampling input signals and/or when the control circuit 310 is writing to the memory 322.

Figure 9:
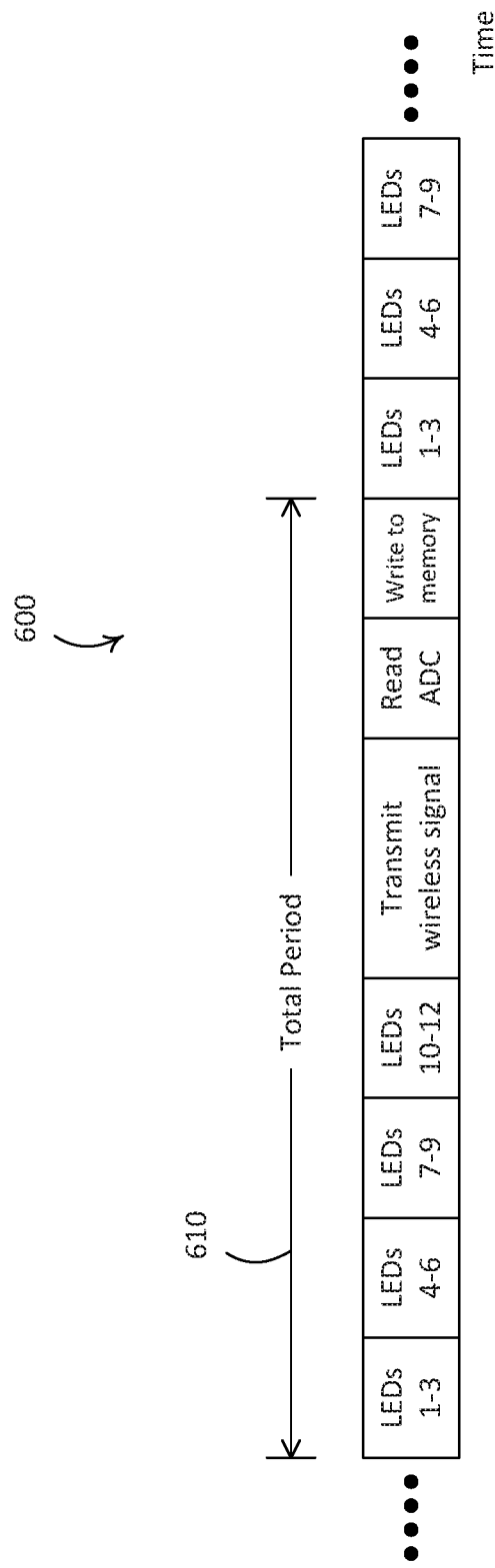
FIG. 9 is a diagram of an example timing procedure that may be executed by a control circuit of a remote control device.

FIG. 9 is a diagram of an example timing procedure 600 of a control circuit of a remote control device, such as the remote control device 120 shown in FIG. 1, the remote control device 200 shown in FIG. 2, and/or the remote control device 300 of FIG. 5. The control circuit may be configured to power circuits and/or complete power-consuming tasks during different segments of time of a repeatable time period 610. For example, the control circuit may wirelessly transmit signals via the communication circuit, sample inputs of the analog-to-digital converter of the control circuit, illuminate LEDs, and/or write to memory of the control circuit, during different segments of time of the repeatable time period 610. The control circuit may perform a plurality of tasks over the repeated total time period 610. The total time period 610 may, for example, include eight time periods as illustrated in FIG. 9. The control circuit may illuminate a first set of LEDs (e.g., LEDs 1-3) in a first time period, illuminate a second set of LEDs (e.g., LEDs 4-6) in a second time period, illuminate a third set of LEDs (e.g., LEDs 7-9) in a third time period, and illuminate a fourth set of LEDs (e.g., LEDs 10-12) in a fourth time period. The control circuit may wirelessly transmit digital messages during the fifth and sixth time periods, sample input signals from the analog-to-digital converter of the control circuit during the seventh time period, and write to memory of the control circuit in the eighth time period.

The control circuit may drive the LEDs using pulse width modulation. As such, the control circuit may be configured to PWM the LEDs using one eighth of the total PWM duty cycle (e.g., such that the seven eighths of the total time period 610 may be used to drive other sets of LEDs or perform other power-consuming tasks). Accordingly, the control circuit may limit the peak power usage to reduce the instantaneous power consumed by the battery 324 by powering circuits and/or completing power-consuming tasks during different segments of time of a repeatable time period 610 (e.g., by interweaving time periods for power-consuming tasks with the time periods when the control circuit drives the LEDs to be illuminated). Although illustrated as wirelessly transmitting signals via the communication circuit, sampling inputs of the analog-to-digital converter of the control circuit, driving the LEDs, and/or writing to memory of the control circuit, the control circuit may be configured to alter which power-consuming task(s) are performed during the different segments of time of the repeatable time period 610.

Figure 10:
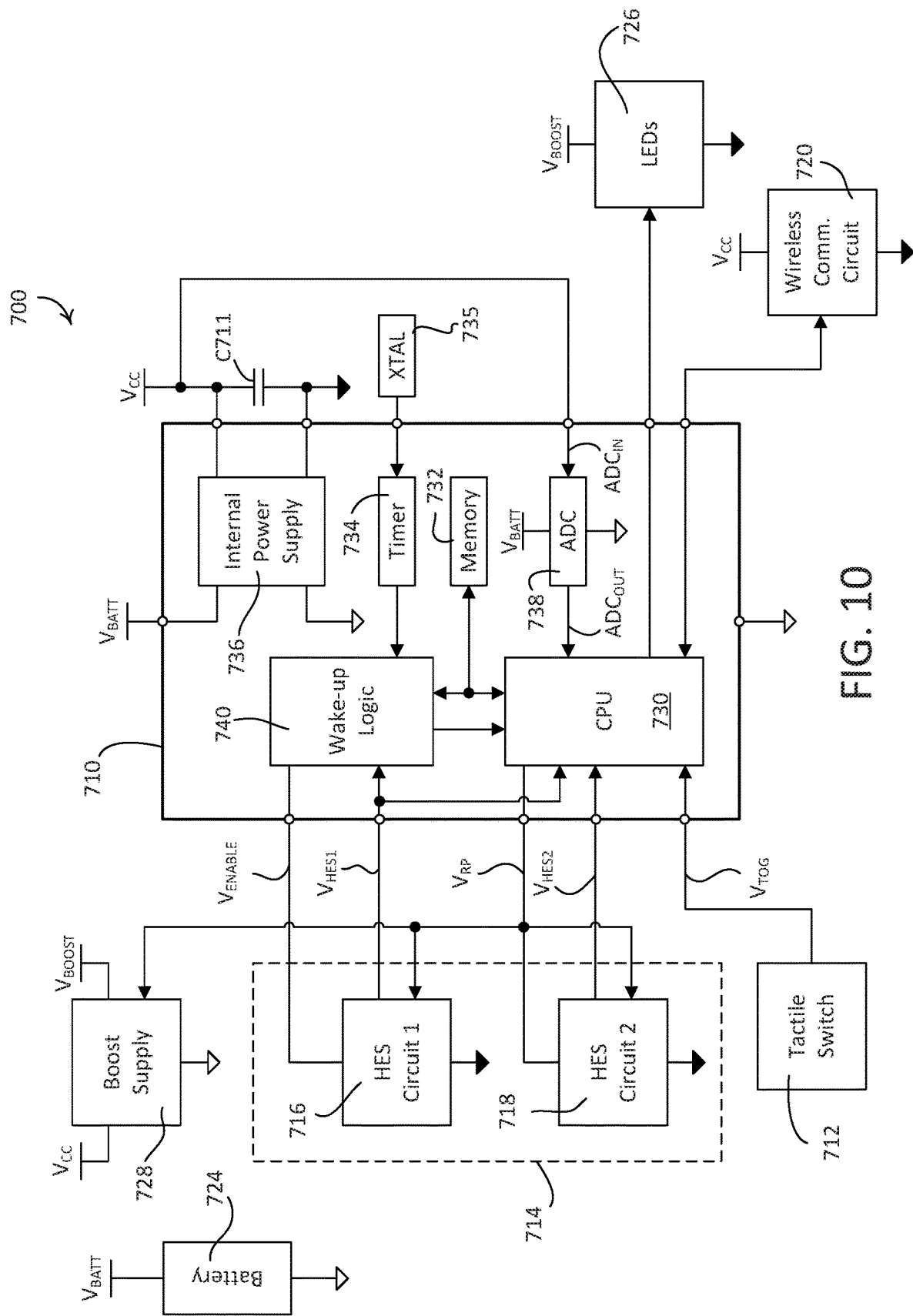
FIG. 10 is a simplified block diagram of another example remote control device.

FIG. 10 is a simplified block diagram of an example remote control device 700 that may be implemented as, for example, the remote control device 120 shown in FIG. 1, the remote control device 200 shown in FIG. 2, and/or the remote control device 300 shown in FIG. 5. The remote control device 700 may comprise a control circuit 710, which may include one or more of a processor (e.g., a microprocessor), a microcontroller, a programmable logic device (PLD), a field programmable gate array (FPGA), an application specific integrated circuit (ASIC), or any suitable processing device. The control circuit 710 may comprise a central processing unit (CPU) 730 (e.g., a processing circuit), which may be configured to execute operating instructions (e.g., software) stored in a memory 732. The memory 732 may be implemented as an internal circuit of the control circuit 710 as shown in FIG. 10 or an external integrated circuit (IC). The control circuit 710 may also comprise a timer 734 that may generate one or more timing signals from an external crystal (XTAL) 735.

The control circuit 710 may comprise an internal power supply 736, e.g., a switching power supply, for generating a regulated DC supply voltage $V_{CC}$ (e.g., approximately 1.8V) for powering the control circuit and other low-voltage circuitry of the remote control device 700. The supply voltage $V_{CC}$ may be generated across a capacitor C711 as shown in FIG. 10. The internal power supply 736 of the control circuit 710 may receive power from a battery 724, which may produce a battery voltage $V_{BATT}$. The CPU 730 of the control circuit 710 may be configured to store the magnitude of the regulated supply voltage $V_{CC}$ in the memory 732 (e.g., at the time of manufacture of the remote control device 700) for use when determining the magnitude of the battery voltage $V_{BATT}$ (e.g., as will be described in greater detail below).

The control circuit 710 may be responsive to a tactile switch 712 that may be actuated in response to actuations of the actuation portion 224 of the control module 220. The tactile switch 712 may generate a toggle control signal $V_{TOG}$ that may be representative of instances when the actuation portion 224 of the control module 220 is pushed towards the mounting assembly 210, so as to, for example, toggle a controlled electrical load on and/or off.

The remote control device 700 may further comprise a rotational sensing circuit 714 including one or more magnetic sensing circuits, e.g., a first Hall-effect sensing (HES) circuit 716 and a second Hall-effect sensing (HES) circuit 718 as shown in FIG. 10. The first and second Hall-effect sensing circuits 716, 718 may represent the Hall-effect sensing circuits 280 that each comprise a Hall-effect sensor integrated circuit 282 and two magnetic flux pipe structures 286, 288. The Hall-effect sensing circuits 716, 718 may be configured to detect the magnetic fields generated by a circular magnetic element (e.g., the magnetic ring 270) coupled to a rotary knob (e.g., the rotating portion 222 of the control module 220). The first and second Hall-effect sensing circuits 716, 718 may generate respective first and second HES output signals $V_{HES1}$, $V_{HES2}$ (e.g., as shown in FIGS. 6A and 6B). The first and second HES output signals $V_{HES1}$, $V_{HES2}$ may, in combination, be representative of an angular velocity ω at which the rotating portion 222 is rotated and/or an angular direction (e.g., clockwise or counter-clockwise) in which the rotating portion 222 is rotated. The control circuit 710 may be configured to determine the angular velocity ω and the angular direction of the rotating portion 222 in response to the first and second HES output signals $V_{HES1}$, $V_{HES2}$. If the remote control device 700 comprises a single magnetic sensing circuit (e.g., just the first Hall-effect sensing circuit 716), the control circuit 710 may be configured to determine the angular velocity ω of the rotating portion 222 in response to the first HES output signal $V_{HES1}$.

Alternatively or additionally, the remote control device 700 could comprise a single integrated circuit having two internal Hall-effect sensing circuits. In addition, while the magnetic sensing circuits are shown as the first and second Hall-effect sensing circuits 716, 718 in FIG. 10, the magnetic sensing circuits could be implemented as any type of magnetic sensing circuit, such as, for example, a tunneling magnetoresistance (TMR) sensor, an anisotropic magnetoresistance (AMR) sensor, a giant magnetoresistance (GMR) sensor, a reed switch, or other mechanical magnetic sensor. Further, while the remote control device 700 is illustrated as including magnetic sensing circuits, the remote control device 700 may include non-magnetic sensing circuits, such as a capacitive touch sensing circuit, a resistive touch sensing circuit, an accelerometer, etc., additionally or alternatively to the magnetic sensing circuits. The output signals of the magnetic sensing circuits (e.g., the first and second HES output signals $V_{HES1}$, $V_{HES2}$) may be analog or digital signals.

The first and second Hall-effect sensing circuits 716, 718 may be configured to operate in a high-speed mode during which the Hall-effect sensing circuits are very responsive to changes in the magnetic fields generated by the magnetic ring 270. When the Hall-effect sensing circuits 716, 718 are operating in the high-speed mode, the control circuit 710 may be configured to determine the angular velocity ω and/or the angular direction of the rotating portion 222. The first and second Hall-effect sensing circuits 716, 718 may also be configured to operate in a low-speed mode during which the Hall-effect sensing circuits may sample the magnetic fields generated by the magnetic ring 270 at a second sampling rate that is less than the first sampling rate during the high-speed mode, which causes the Hall-effect sensing circuits to be less responsive to changes in the magnetic fields generated by the magnetic ring 270 and the Hall-effect sensing circuits consume less power than in the high-speed mode. During the low-speed mode, the control circuit 710 may, for example, be able to determine whether the rotating portion 222 is being rotated.

The remote control device 700 may also include a wireless communication circuit 720, for example an RF transmitter coupled to an antenna, for transmitting wireless signals, such as the RF signals 108, in response to the CPU 730 receiving the first and second HES output signals $V_{HES1}$, $V_{HES2}$ (e.g., based on rotations of the rotating portion 222) and receiving the toggle control signal $V_{TOG}$ (e.g., based on actuations of the actuation portion 224). The CPU 730 of the control circuit 710 may be configured to cause the wireless communication circuit 720 to transmit digital messages via one or more wireless signals to an associated load control device, for example the controllable light source 110 shown in FIG. 1. The CPU 730 of the control circuit 710 may be configured to use the memory 732 for the storage and/or retrieval of, for example, a unique identifier (e.g., a serial number) of the remote control device 700 that may be included in the transmitted RF signals. In response one or more of the toggle control signal $V_{TOG}$ and the first and second HES output signals $V_{HES1}$, $V_{HES2}$, the CPU 730 of the control circuit 710 may cause the wireless communication circuit 720 to transmit one or more signals, for example RF signals 108, to a controllable light source associated with the rotary remote control device 700, for example the lighting load of the controllable light source 110 shown in FIG. 1. The remote control device 700 may include one or more visual indicators, for example, one or more LEDs 726 (e.g., the LEDs 246 of the control module 220 shown in FIG. 4), which are configured to provide feedback to a user of the remote control device 700. For example, the LEDs 726 may be configured to illuminate the light bar 226. The CPU 730 of the control circuit 710 may be operatively coupled to the LEDs 726. The CPU 730 of the control circuit 710 may be configured to pulse-width modulate the LEDs 726. In some examples, the CPU 730 of the control circuit 710 may be configured to only illuminate a subset of the LEDs (e.g., three LEDs) at a single time to reduce the peak current conducted through the battery 724. The CPU 730 of the control circuit 710 may control the LEDs 726 to provide feedback indicating a status of the controllable light source 110, for example if the controllable light source 110 is on or off, or a present intensity of the controllable light source 110.

The CPU 730 of the control circuit 710 may be configured to determine the magnitude of the battery voltage $V_{BATT}$ of the battery 724, which may change (e.g., decrease) over time as the battery ages. The CPU 730 of the control circuit 710 may be configured to illuminate the LEDs 726 in order to provide an indication that the battery 724 is low on energy, to provide feedback during programming or association of the remote control device 700, and/or to provide a night light. The control circuit 710 may comprise an internal analog-to-digital converter (ADC) 738 that is referenced to the battery voltage $V_{BATT}$ (e.g., between the positive and negative terminals of the battery 724). The CPU 730 of the control circuit 710 may be configured to use the magnitude of the regulated DC supply voltage $V_{CC}$ to estimate the magnitude of the battery voltage $V_{BATT}$. Specifically, the regulated supply voltage $V_{CC}$ may be provided to an input $ADC_{IN}$ of the ADC 738, for example, as shown in FIG. 10. The CPU 730 of the control circuit 710 may be configured to sample the magnitude of the supply voltage $V_{CC}$ at the input $ADC_{IN}$ using the ADC 738 to generate a measured voltage value at the output $ADC_{OUT}$ of the analog-to-digital converter.

Since the ADC 738 is referenced to the battery voltage $V_{BATT}$, the measurement of the magnitude of the supply voltage $V_{CC}$ (e.g., the measured voltage at the output $ADC_{OUT}$ of the analog-to-digital converter) may be dependent upon the magnitude of the battery voltage $V_{BATT}$, e.g., $$ADC_{OUT}=(V_{ADC-IN}/V_{BATT}) \cdot BITS_{ADC},$$

where $V_{ADC-IN}$ is the measured voltage at the input $ADC_{IN}$ of the ADC 738 and $BITS_{ADC}$ is the resolution of the analog-to-digital converter (e.g., 8-12 bits). Since the supply voltage $V_{CC}$ is provided to the analog input $ADC_{IN}$ of the ADC 738 and the magnitude of the regulated supply voltage $V_{CC}$ is known (e.g., 1.8 volts), the CPU 730 of the control circuit 710 may be able to calculate the magnitude of the battery voltage $V_{BATT}$ using the output $ADC_{OUT}$, the measured voltage $V_{ADC-IN}$, and the resolution $BITS_{ADC}$, e.g., $$V_{BATT}=(V_{ADC-IN}/ADC_{OUT}) \cdot BITS_{ADC}.$$

Thus, the CPU 730 of the control circuit 710 may be able to determine the magnitude of the battery voltage $V_{BATT}$ without the need to scale magnitude of the battery voltage down to a level that the ADC 738 of the control circuit 710 can sample, for example, using a resistive divider, which would consume additional battery power.

The remote control device 700 may comprise a converter circuit, e.g., a boost power supply 728, which may receive the supply voltage $V_{CC}$ and generate a boosted DC voltage $V_{BOOST}$. The boosted DC voltage $V_{BOOST}$ may have a magnitude greater than the magnitude of the supply voltage $V_{CC}$ for driving the LEDs 726 (e.g., approximately 2.6-2.8 volts). The boost power supply 728 may be configured to be enabled and disabled such that the boost power supply 728 only generates the boosted voltage $V_{BOOST}$ when the LEDs 726 need to be illuminated (e.g., when the rotating portion 222 is being rotated or when the actuation portion 224 is actuated). Additionally or alternatively, the converter circuit of the remote control device 700 may comprise an inverter circuit for generating a negative DC voltage $V_{CC-NEG}$ (e.g., −1.8 volts) from the supply voltage $V_{CC}$, and the LEDs may be coupled between the supply voltage $V_{CC}$ and the negative DC voltage $V_{CC-NEG}$.

The control circuit 710 may be configured to operate in a normal mode in response to rotations of the rotating portion 222 and/or in response to actuations of the actuation portion 224. In the normal mode, the CPU 730 of the control circuit 710 may be configured to monitor the Hall-effect sensing circuits 716, 718 to determine the angular velocity ω and/or the angular direction of the rotating portion 222. In the normal mode, the CPU 730 of the control circuit 710 may be configured to transmit digital messages via the wireless communication circuit 720, enable the boost power supply 728, and illuminate the LEDs 726 in the normal mode.

The control circuit 710 may be configured to operate in a reduced-power mode (e.g., an idle mode) when the when the rotating portion 222 and the actuation portion 224 are not being actuated. When operating in the reduced-power mode, the CPU 730 of the control circuit 710 may be configured to turn off the LEDs 726, disable the boost power supply 728, change the Hall-effect sensing circuits 716, 718 to the low-speed mode, and/or disable one of the Hall-effect sensing circuits, such that the remote control device 700 consumes less power.

In addition, the control circuit 710 may be configured to control the first Hall-effect sensing circuit 716 during the reduced-power mode to sample the magnetic fields generated by the magnetic ring 270 at a third sampling rate that is between the first sampling rate of the first Hall-effect sensing circuit during the high-speed mode and the second sampling rate of the first Hall-effect sensing circuit during the low-speed mode. The control circuit 720 may be configured to generate an enable control signal $V_{ENABLE}$ for selectively enabling and disabling the first Hall-effect sensing circuit 716 during the reduced-power mode as will be described in greater detail below. In the reduced-power mode, the control circuit 710 may be configured to pulse-width modulate the enable control signal $V_{ENABLE}$ to periodically enable and disable the first Hall-effect sensing circuit 716 to sample the magnetic fields generated by the magnetic ring 270 at the third sampling rate. The third sampling rate may be adjustable to allow the control circuit 710 to adjust an average power dissipation of the first Hall-effect sensing circuit 716 during the reduced-power mode. The control circuit 710 may be configured to adjust a duty cycle of the enable control signal $V_{ENABLE}$ to adjust the third sampling rate. Further, remote control device 700 may include other types of sampling circuits that are configured with one or more static sampling rates (e.g., such as a touch responsive circuit), and the control circuit 710 may be configured to control such circuits in a similar manner. In such instances, and for example, the control circuit 710 may be configured to control such sensing circuit(s) at a third sampling rate during the reduced-power mode that is between a first sampling rate performed during a high-speed mode and a second sampling rate performed during a low-speed mode.

The CPU 730 of the control circuit 710 may generate a reduced power control signal $V_{RP}$ for changing between the normal mode and the reduced-power mode. For example, the CPU 730 of the control circuit 710 may be configured to enter the normal mode by driving the reduced power control signal $V_{RP}$ high and to enter the reduced-power mode by driving the reduced power control signal $V_{RP}$ low. The second Hall-effect sensing circuit 718 may be powered by the reduced power control signal $V_{RP}$. The CPU 730 of the control circuit 710 may be configured to enable the second Hall-effect sensing circuit 718 by driving the reduced power control signal $V_{RP}$ high towards the supply voltage $V_{CC}$, and disable the second Hall-effect sensing circuit by driving the reduced power control signal $V_{RP}$ low. The reduced power control signal $V_{RP}$ may also be received at enable pins of the Hall-effect sensor integrated circuits of one or each of the first and second Hall-effect sensing circuits 716, 718. The CPU 730 of the control circuit 710 may be configured to change the Hall-effect sensing circuits 716, 718 between the low-speed and high-speed modes using the reduced power control signal $V_{RP}$. The CPU 730 of the control circuit 710 may also be configured to enable and disable the boost power supply 728 using the reduced power control signal $V_{RP}$. Thus, as in the remote control device 300 shown in FIG. 5, the CPU 730 of the control circuit 710 may use a single output pin to enable and disable the second Hall-effect sensing circuit 718, change the Hall-effect sensing circuits 716, 718 between the low-speed and high-speed modes, and enable and disable the boost power supply 728.

When the rotating portion 222 and the actuation portion 224 are not being actuated (e.g., when the magnitudes of the first and second HES output signals $V_{HES1}$, $V_{HES2}$ are in a steady state condition), the control circuit 710 may operate in the reduced-power mode, during which the CPU 730 of the control circuit 710 may disable the second Hall-effect sensing circuit 718, put the first Hall-effect sensing circuit 716 in the low-speed mode, and/or disable the boost power supply 728 by driving the reduced power control signal $V_{RP}$ low. In addition, the CPU 730 of the control circuit 710 may be configured to enter a sleep state during the reduced-power mode.

The control circuit 710 may comprise a wake-up logic circuit 740 for detecting a first new movement (e.g., rotation) of the rotating portion 222 during the reduced-power mode and waking up the CPU 730. The wake-up logic circuit 740 may generate a wake-up signal $V_{WAKE-UP}$ for waking up the CPU 730. The wake-up logic circuit 740 may be configured to generate the enable control signal $V_{ENABLE}$ for selectively enabling and disabling the first Hall-effect sensing circuit 716 (e.g., by driving the enable control signal high and low, respectively). As shown in FIG. 10, the first Hall-effect sensing circuit 716 may be powered by the enable control signal $V_{ENABLE}$ (e.g., through a pin of the control circuit 710). In the reduced-power mode, the wake-up logic circuit 740 may be configured to pulse-width modulate the enable control signal $V_{ENABLE}$ to periodically enable and disable the first Hall-effect sensing circuit 716 (e.g., to cycle power to the first Hall-effect sensing circuit). As previously mentioned, the CPU 730 may be configured to adjust the duty cycle of the enable control signal $V_{ENABLE}$ (e.g., at the third sampling rate) to adjust an average power dissipation of the first Hall-effect sensing circuit 716 during the reduced-power mode.

When the enable control signal $V_{ENABLE}$ is driven high to enable the first Hall-effect sensing circuit 716, the first HES output signal $V_{HES1}$ may be in an invalid state for a predetermined amount of time $T_{INVALID}$ until the wake-up logic circuit 740 may sample the first HES output signal $V_{HES1}$ to determine if the rotating portion 222 has moved since the last time that the first HES output signal $V_{HES1}$ was sampled. For example, a previous state of the first HES output signal $V_{HES1}$ (e.g., high or low representing either one of the positive and negative sections 272, 274 of the magnetic ring 270, respectively) may be stored in the memory 732. After driving the enable control signal $V_{ENABLE}$ high, the wake-up logic circuit 740 may wait for the predetermined amount of time $T_{INVALID}$ before opening a sampling window to sample the first HES output signal $V_{HES1}$. The wake-up logic circuit 740 may compare the sampled value of the first HES output signal $V_{HES1}$ (e.g., high or low) to the previous state of the first HES output signal $V_{HES1}$ as stored in the memory 732. If the sampled value of the first HES output signal $V_{HES1}$ is different than the previous state of the first HES output signal $V_{HES1}$, the wake-up logic circuit 740 may wake up the CPU 730 by driving the wake-up signal $V_{WAKE-UP}$ high.

Any combination of the CPU 730, the memory 732, the timer 734, the power supply 736, the ADC 738, and the wake-up logic circuit 740 may be implemented as part of a single integrated circuit. Alternatively, the wake-up logic circuit 740 may be a separate circuit external to the integrated circuit of the CPU 730. For example, the wake-up logic circuit 740 could be made up of one or more discrete logic integrated circuits external to the integrated circuit of the CPU 730.

Figure 11:
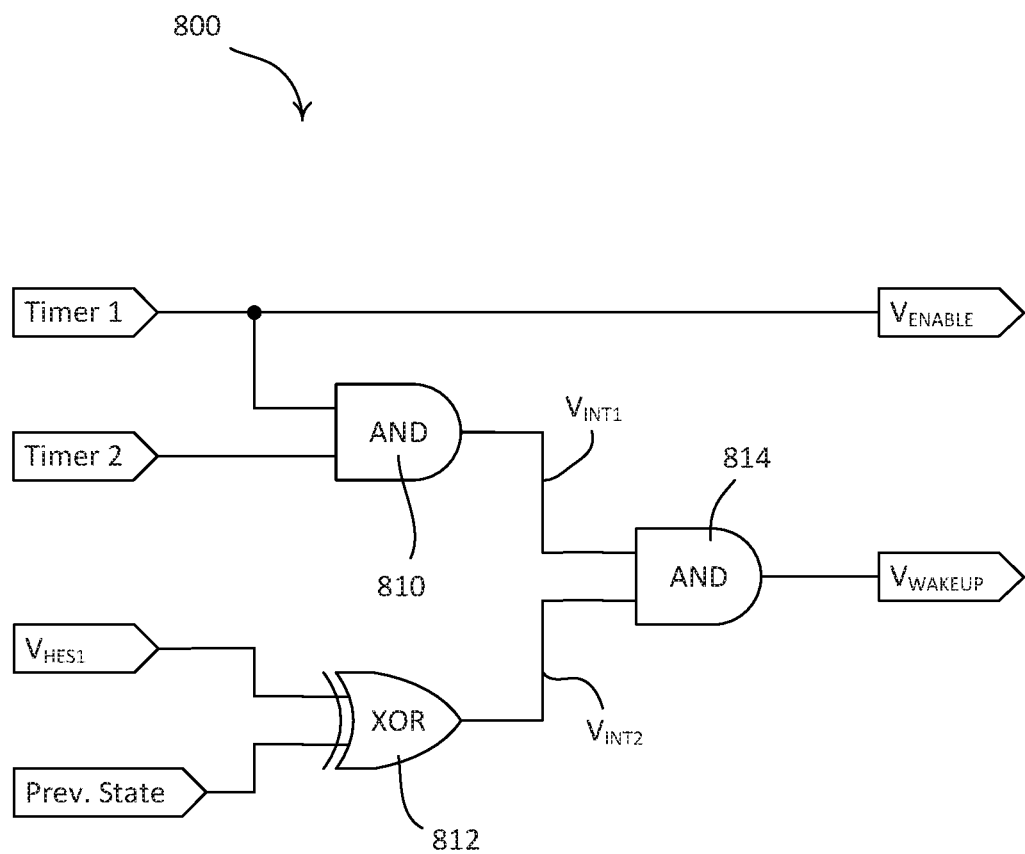
FIG. 11 is a simplified block diagram of an example wake-up logic circuit.

FIG. 11 is a simplified block diagram of an example wake-up logic circuit 800, which may be implemented as the wake-up logic circuit 740 of the control circuit 710 of the remote control device 700 shown in FIG. 10. FIG. 12 shows example waveforms illustrating the operation of the wake-up enable circuit 800. The wake-up logic circuit 800 may receive first and second timer signals from a timer (e.g., the timer 734 of the control circuit 710). The first timer signal $V_{TIMER1}$ may be provided at a first output of the wake-up logic circuit 800, e.g., as the enable control signal $V_{ENABLE}$ that is provided to the first Hall-effect sensing circuit 716. During the reduced-power mode, the first timer signal $V_{TIMER1}$ may be a pulse-width modulated signal for periodically enabling and disabling the first Hall-effect sensing circuit 716. For example, the first timer signal $V_{TIMER1}$ may be characterized by a period $T_{T1}$ of approximately 10 milliseconds and an on-time $T_{ON1}$ of approximately 100 microseconds during the reduced-power mode.

The second timer signal $V_{TIMER2}$ may be used to determine when the wake-up logic circuit 740 is responsive to the first HES output signal $V_{HES1}$. During the reduced-power mode, the second timer signal $V_{TIMER2}$ may be a pulse-width modulated signal characterized by a period $T_{T2}$ of approximately 10 milliseconds and an on-time $T_{ON1}$ of approximately 10 microseconds during the reduced-power mode. The on-time $T_{ON2}$ of the second timer signal $V_{TIMER2}$ may be shorter than the on-time $T_{ON1}$ of the first timer signal $V_{TIMER1}$. The second timer signal $V_{TIMER2}$ may be synchronized to the first timer signal $V_{TIMER1}$, such that the pulses of the on-times $T_{ON2}$ of the second timer signal fall within the on-times $T_{ON1}$ of the first timer signal. The on-time $T_{ON2}$ of the second timer signal $V_{TIMER2}$ may occur after the period of time that the first HES output signal $V_{HES1}$ may be in the invalid state after the beginning of the on-time $T_{ON1}$ of the first timer signal $V_{TIMER1}$. For example, there may be a delay from when the first timer signal $V_{TIMER1}$ is driven high to when the second timer signal $V_{TIMER2}$ is driven high of approximately the predetermined amount of time $T_{INVALID}$ for which the first HES output signal $V_{HES1}$ may be in the invalid state as shown in FIG. 12.

The first and second timer signals $V_{TIMER1}$, $V_{TIMER2}$ may be received by an AND logic gate 810. The AND logic gate 810 may generate a first intermediate signal $V_{INT1}$, which may be driven high when both of the first and second timer signals $V_{TIMER1}$, $V_{TIMER2}$ are high. A present sampled state $S_{PRES}$ of the first HES output signal $V_{HES1}$ and a previous sampled state $S_{PREV}$ of the first HES output signal $V_{HES1}$ (e.g., as stored in the memory 732) are received by an XOR logic gate 812. The XOR logic gate 812 may generate a second intermediate signal $V_{INT2}$, which may be driven high when the present sampled state $S_{PRES}$ and the previous sampled state $S_{PREV}$ are different. The first and second intermediate signals $V_{INT1}$, $V_{INT2}$ may be received by an AND logic gate 814. The AND logic gate 814 may generate a wake-up signal $V_{WAKE-UP}$, which may be driven high when both of the first and second timer signals are high and the present sampled state $S_{PRES}$ and the previous sampled state $S_{PREV}$ are different. The wake-up signal $V_{WAKE-UP}$ may be received by the CPU 730 for causing the CPU to change from a sleep state to an active state.

After waking up, the CPU 730 may cause the wake-up logic circuit 740 to drive the enable control signal $V_{ENABLE}$ high (e.g., by stopping pulse-width modulating the enable control signal $V_{ENABLE}$) to continuously power the first Hall-effect sensing circuit 716 in the normal mode. The CPU 730 may drive the reduced power control signal $V_{RP}$ high to enable the second Hall-effect sensing circuit 718, after which both of the Hall-effect sensing circuits 716, 718 may begin to generate the first and second HES output signals $V_{HES1}$, $V_{HES2}$ (e.g., as shown in FIG. 12). After a period of inactivity of the rotating portion 222 and/or the actuation portion 224, the control circuit 710 may be configured to enter the sleep state. Before entering the sleep state, the control circuit 710 may be configured to configure the timer 734 to generate the first and second timer signals $V_{TIMER1}$, $V_{TIMER2}$ and configure the wake-up logic circuit 740 (e.g., the logic gate circuitry) to generate the wake-up signal.

Figure 13:
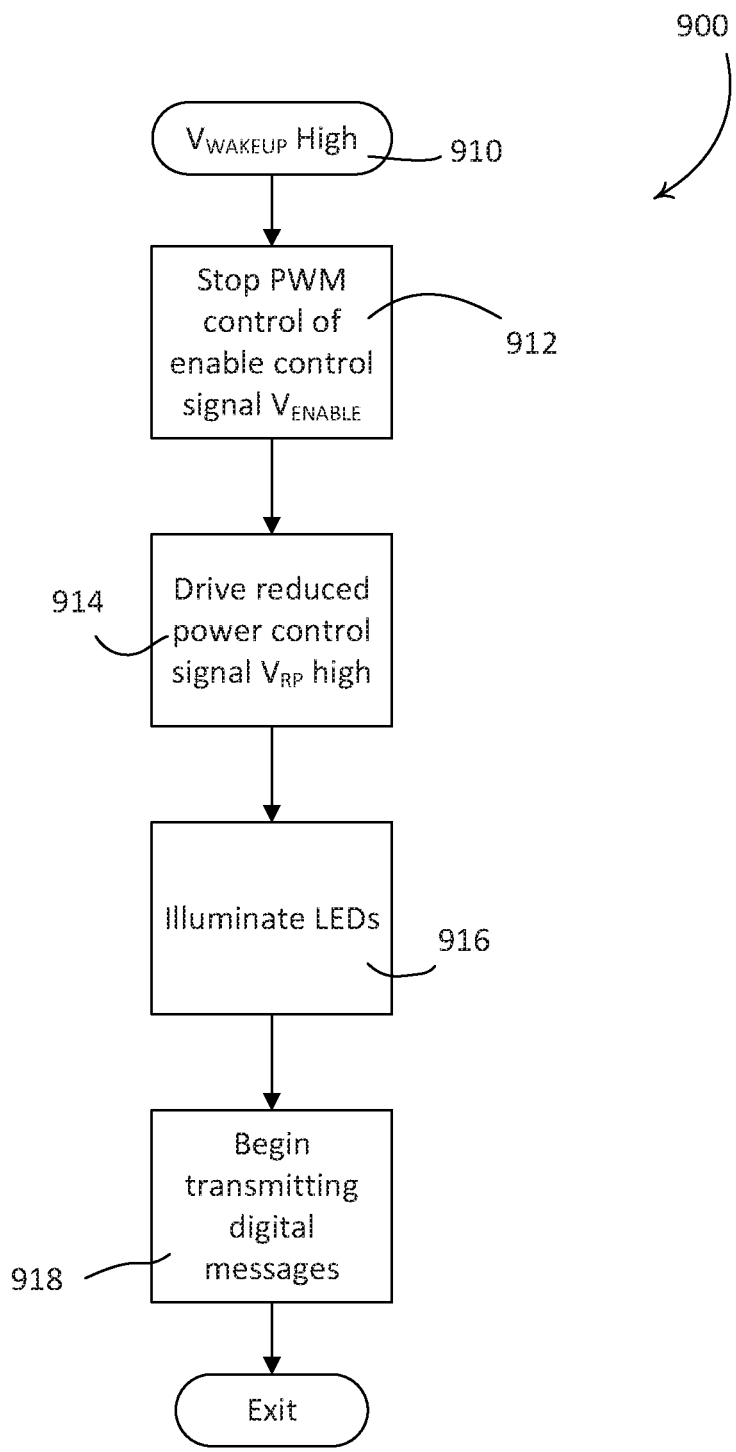
FIG. 13 is a diagram of an example wake-up procedure that may be executed by a control circuit of a remote control device.

FIG. 13 is a simplified flowchart of an example wake-up procedure 900 that may be executed by a control circuit of a remote control device (e.g., the control circuit 710 of the remote control device 700 shown in FIG. 10) in order to detect a user input, such as movement, of an actuator (e.g., the rotating portion 222). For example, the control circuit may be configured to operate in a reduced-power mode when the rotating portion 222 is not being rotated. The wake-up procedure 900 may be executed at 910 when a wake-up signal $V_{WAKE-UP}$ is driven high (e.g., by a wake-up logic circuit, such as the wake-up logic circuit 800 shown in FIG. 11). At 912, the control circuit may cause the wake-up logic circuit to stop pulse-width modulating an enable control signal $V_{ENABLE}$ to cause a first Hall-effect sensing circuit (e.g., the first Hall-effect sensing circuit 716) to be continuously powered. At 914, the control circuit may drive a reduced power control signal $V_{RP}$ high to enter the normal mode. The control circuit may then illuminate LEDs (e.g., the LEDs 328) at 916 and begin transmitting wireless signals for controlling associated load control devices (e.g., via the wireless communication circuit 320) at 918, before the wake-up procedure 900 exits.

What is claimed is:

1. A control device comprising:
    an actuator;
    a sensing circuit configured to generate at least one sensing signal in response to actuations of the actuator;
    a wireless communication circuit configured to transmit wireless signals;
    a visual indicator configured to be illuminated;
    a control circuit configured to detect an actuation of the actuator in response to the sensing signal, the control circuit configured to transmit the wireless signals via the wireless communication circuit and illuminate the visual indicator in response to the actuation of the actuator; and
    a battery configured to power the control circuit and the sensing circuit;
    wherein the control circuit is configured to detect an occurrence of persistent actuation of the actuator after a maximum usage period of the persistent actuation of the actuator, the control circuit configured to continue transmitting the wireless signals but stop illuminating the visual indicator in response detecting the persistent actuation of the actuator.

2. The control device of claim 1, wherein the actuator comprises a rotatable portion, and the sensing circuit comprises a rotational sensing circuit.

3. The control device of claim 2, wherein the control device is configured to operate in an active mode when the rotatable portion is being rotated and in a reduced-power mode when the rotatable portion is not being rotated.

4. The control device of claim 3, further comprising:
    one or more magnetic elements configured to generate magnetic fields, the one or more magnetic elements connected to the rotatable portion;
    wherein the rotational sensing circuit comprises first and second magnetic sensing circuits, and the at least one sensing signal comprises first and second sensor signals generated by the first and second magnetic sensing circuits, respectively, in response to the magnetic fields generated by the magnetic elements when the control device is operating in the active mode.

5. The control device of claim 4, wherein the control circuit is configured to determine an angular speed and/or an angular direction of the rotatable portion in response to the first and second sensor signals generated by the first and second magnetic sensing circuits, respectively.

6. The control device of claim 5, wherein, when the control device is operating in the reduced-power mode, the control circuit is configured to:
    disable the second magnetic sensing circuit;
    detect movement of the rotatable portion in response to the first sensor signal; and
    in response to detecting movement of the rotatable portion, enable the second magnetic sensing circuit and cause the control device to operate in the active mode.

7. The control device of claim 2, wherein the persistent actuation of the actuator is a continuous rotation of the rotatable portion.

8. The control device of claim 2, wherein, after the end of a rotation of the rotatable portion, the control circuit is configured to control the visual indicator to be illuminated for a first predetermined amount of time, after which the control circuit is configured to fade the visual indicator to off over a second predetermined amount of time.

9. The control device of claim 1, wherein the control circuit is configured to enter a sleep state when the sensing signal is in a steady state condition.

10. The control device of claim 9, further comprising:
    a wake-up logic circuit configured to:
        generate and pulse-width modulate (PWM) an enable control signal when the control circuit is in the sleep state to periodically enable and disable the sensing circuit;
        receive the sensing signal from the sensing circuit;

determine that a magnitude of the sensing signal has changed; and upon determining that the magnitude of the sensing signal has changed, generate a wake-up signal for causing the control circuit to change from the sleep state to an active state.

11. The control device of claim 1, wherein the maximum usage period comprises multiple distinct time periods of persistent actuation that occur in succession.

12. The control device of claim 11, wherein the control circuit is configured to stop accumulating the multiple periods of persistent actuation if a timeout period of no actuations of the actuator passes.

13. The control device of claim 1, wherein the control circuit is configured to accumulate multiple periods of persistent actuation until the maximum usage period is exceeded.

14. The control device of claim 1, wherein the visual indicator comprises a light bar configured to be illuminated to display visual feedback.

15. The control device of claim 1, wherein the maximum usage period is approximately 10 to 15 seconds.

16. A method comprising:
detecting an actuation of the actuator;
transmitting wireless signals in response to the actuation of the actuator;
illuminating a visual indicator in response to the actuation of the actuator;
detecting an occurrence of persistent actuation of the actuator after a maximum usage period of the persistent actuation of the actuator; and continue transmitting the wireless signals but stop illuminating the visual indicator in response detecting the persistent actuation of the actuator.

17. The method of claim 16, further comprising:
generating a sensing signal in response to actuations of an actuator of a control device; and
detecting an actuation of the actuator in response to the sensing signal.

18. The method of claim 16, wherein the maximum usage period comprises multiple distinct time periods of persistent actuation that occur in succession.

19. The method of claim 18, further comprising; stop accumulating the multiple periods of persistent actuation if a timeout period of no actuations of the actuator passes.

20. A control device comprising:

an actuator;

a control circuit configured to detect an actuation of the actuator, the control circuit configured to transmit wireless signals and illuminate a visual indicator in response to the actuation of the actuator; and wherein the control circuit is configured to detect an occurrence of persistent actuation of the actuator after a maximum usage period of the persistent actuation of the actuator, the control circuit configured to continue transmitting the wireless signals but stop illuminating the visual indicator in response detecting the persistent actuation of the actuator.

* * * * *